(12) United States Patent
Hanson et al.

(10) Patent No.: US 7,890,417 B2
(45) Date of Patent: Feb. 15, 2011

(54) ELECTRONIC BLOCK TRADING SYSTEM AND METHOD OF OPERATION

(75) Inventors: Paul Hanson, Calgary (CA); Mark Beddis, West Vancouver (CA); James Bird, Calgary (CA); Geoff Kratz, Calgary (CA); James Lee, Calgary (CA); Sik Ngai, Calgary (CA)

(73) Assignee: BIDS Trading, L.P., New York, NY (US)

( * ) Notice: Subject to any disclaimer, the term of this patent is extended or adjusted under 35 U.S.C. 154(b) by 494 days.

(21) Appl. No.: 12/024,050

(22) Filed: Jan. 31, 2008

(65) Prior Publication Data

US 2009/0006266 A1    Jan. 1, 2009

Related U.S. Application Data

(60) Provisional application No. 60/887,507, filed on Jan. 31, 2007.

(51) Int. Cl.
 *G06Q 40/00* (2006.01)
(52) U.S. Cl. .................. 705/37; 705/36 R; 705/38; 705/39
(58) Field of Classification Search ............ 705/37
See application file for complete search history.

(56) References Cited

U.S. PATENT DOCUMENTS

| | | | |
|---|---|---|---|
| 3,573,747 A | 4/1971 | Adams et al. | |
| 4,412,287 A | 10/1983 | Braddock, III | |
| 5,077,665 A | 12/1991 | Silverman et al. | |
| 5,136,501 A | 8/1992 | Silverman et al. | |
| 5,195,031 A | 3/1993 | Ordish et al. | |
| 5,375,055 A | 12/1994 | Togher et al. | |
| 5,727,165 A | 3/1998 | Ordish et al. | |
| 5,732,400 A | 3/1998 | Mandler et al. | |
| 5,924,082 A | 7/1999 | Silverman et al. | |
| 6,131,087 A | 10/2000 | Luke et al. | |
| 6,311,178 B1 | 10/2001 | Bi et al. | |
| 6,332,135 B1 | 12/2001 | Conklin et al. | |
| 6,336,105 B1 | 1/2002 | Conklin et al. | |
| 6,338,050 B1 | 1/2002 | Conklin et al. | |

(Continued)

FOREIGN PATENT DOCUMENTS

CA    2197768    2/1996

(Continued)

OTHER PUBLICATIONS

Patent Cooperation Treaty, International Search Report, dated May 21, 2008, 2 pages.

*Primary Examiner*—Ella Colbert
*Assistant Examiner*—Daniel L Greene, Jr.
(74) *Attorney, Agent, or Firm*—Wilmer Cutler Pickering Hale and Dorr LLP

(57) ABSTRACT

A system and method are described and disclosed that are used for effecting large block trades of securities in an automated and anonymous matter in which fair pricing is carried out using features of the NBBO. The automated trading the system and method also will carry out negotiations to effect a trade in certain circumstances, though the preferred method of effecting trades is by automated trading. However, regardless of the trading method, anonymity of the trading counterparties is preserved. The system and method also tests the NBBO for each of the traded securities to ensure it is valid before an automated trade may take place.

37 Claims, 17 Drawing Sheets

U.S. PATENT DOCUMENTS

| | | |
|---|---|---|
| 6,418,419 B1 | 7/2002 | Nieboer et al. |
| 6,496,851 B1 | 12/2002 | Morris et al. |
| 6,519,574 B1 | 2/2003 | Wilton et al. |
| 6,704,716 B1 | 3/2004 | Force |
| 6,996,541 B2 | 2/2006 | Togher et al. |
| 7,024,387 B1 | 4/2006 | Nieboer et al. |
| 7,033,488 B2 | 4/2006 | Rockwell |
| 7,035,819 B1 | 4/2006 | Gianakouros et al. |
| 7,136,834 B1 | 11/2006 | Merrin et al. |
| 2001/0047332 A1 | 11/2001 | Gonen-Friedman et al. |
| 2001/0051909 A1 | 12/2001 | Keith |
| 2002/0005827 A1 | 1/2002 | Kobayashi |
| 2002/0007337 A1 | 1/2002 | Schade et al. |
| 2002/0010672 A1 | 1/2002 | Waelbroeck et al. |
| 2002/0016976 A1 | 2/2002 | Shokat |
| 2002/0052825 A1 | 5/2002 | Bensemana |
| 2002/0055901 A1 | 5/2002 | Gianakouros et al. |
| 2002/0169706 A1 | 11/2002 | Chandra et al. |
| 2003/0004859 A1 | 1/2003 | Shaw et al. |
| 2003/0046217 A1 | 3/2003 | Deaderick et al. |
| 2003/0061069 A1 | 3/2003 | Silverman et al. |
| 2003/0088499 A1 | 5/2003 | Gilbert et al. |
| 2003/0120585 A1 | 6/2003 | Rosenblatt |
| 2003/0204467 A1 | 10/2003 | Kartha et al. |
| 2004/0034591 A1 | 2/2004 | Waelbroeck et al. |
| 2004/0059666 A1 | 3/2004 | Waelbroeck et al. |
| 2004/0153392 A1 | 8/2004 | West et al. |
| 2004/0153394 A1 | 8/2004 | West et al. |
| 2004/0177025 A1 | 9/2004 | Spoonhower et al. |
| 2004/0193525 A1 | 9/2004 | Huang |
| 2004/0210511 A1 | 10/2004 | Waelbroeck et al. |
| 2004/0254875 A1 | 12/2004 | Byde et al. |
| 2005/0108125 A1 | 5/2005 | Goodwin et al. |
| 2005/0187858 A1 | 8/2005 | Graham et al. |
| 2005/0246261 A1 | 11/2005 | Stevens et al. |
| 2005/0283426 A1 | 12/2005 | Krishnasami et al. |
| 2005/0289039 A1 | 12/2005 | Greak |
| 2006/0047598 A1 | 3/2006 | Hansen |
| 2006/0059082 A1 | 3/2006 | Silverman et al. |
| 2006/0224587 A1 | 10/2006 | Zamir et al. |
| 2007/0055607 A1 | 3/2007 | Wunsch et al. |

FOREIGN PATENT DOCUMENTS

| | | |
|---|---|---|
| CA | 2338145 | 11/2000 |
| CA | 2377481 | 1/2001 |
| CA | 2381174 | 2/2001 |
| CA | 2386121 | 4/2001 |
| CA | 2389828 | 5/2001 |
| CA | 2383113 | 12/2001 |
| CA | 2477742 | 9/2003 |
| CA | 2394967 | 12/2003 |
| CA | 2504600 | 5/2004 |
| CA | 2530714 | 2/2005 |
| EP | 0399850 | 11/1990 |
| EP | 0407026 | 1/1991 |
| EP | 0416482 | 3/1991 |
| EP | 0434224 | 6/1991 |
| EP | 0491455 | 6/1992 |
| GB | 2294788 | 5/1996 |
| JP | 5314139 | 11/1993 |
| JP | 2000172761 | 6/2000 |
| WO | WO-9722072 | 6/1997 |
| WO | WO-02/095638 | 11/2002 |

― 200

NBBO $40.10 -$40.14, Mid-Point is $40.12

Buy @ $40.13, Sell @ $40.13

Trade Price: $40.13

NBBO $40.10 -$40.14, Mid-Point is $40.12

Buy @ $40.15, Sell @ $40.15

Trade Price: $40.15

NBBO $40.10 -$40.14, Mid-Point is $40.12

Buy @ $40.09, Sell @ $40.09

Trade Price: $40.09

NBBO $40.10 -$40.14, Mid-Point is $40.12

Buy @ $40.14, Sell @ $40.10

Trade Price: $40.12

NBBO $40.10 -$40.14, Mid-Point is $40.12

Buy @ $40.11, Sell @ $40.10

Trade Price: $40.11

NBBO $40.10 -$40.14, Mid-Point is $40.12

Buy @ $40.17, Sell @ $40.16

Trade Price: $40.16

NBBO $40.10 -$40.14, Mid-Point is $40.12

Buy @ $40.08, Sell @ $40.07

Trade Price: $40.08

FIG. 6B

| OrderId | Symbol | Side | Px | OrderVol | Leaves | MinVol | MaxAMVol | TradedVol | Sponsor | Type | State | #Negs | Inv |
|---|---|---|---|---|---|---|---|---|---|---|---|---|---|
| L2 | LAB | S | 8.61 | 60,000 | 60,000 | 1,000 | 60,000 | 0 | GS | FrmInv | InNeg | 1 | New |
| LAB1 | LAB | B | 8.58 | 100,000 | 80,000 | 10,000 | 80,000 | 20,000 | GS | FrmInv | InNeg | 1 | New |
| L3 | LAB | S | 8.58 | 20,000 | 0 | 0 | 0 | 20,000 | GS | FrmInv | Matched | 0 | New |
| Q1 | QLTI | B | 6.62 | 100,000 | 100,000 | 50,000 | 100,000 | 0 | GS | FrmInv | InNeg | 1 | New |
| Q2 | QLTI | SS | 6.64 | 800,000 | 800,000 | 10,000 | 800,000 | | | | | | |
| T1 | TOY | S | 26.35 | 50,000 | 50,000 | 10,000 | 50,000 | 0 | GS | FrmInv | Crossed | 0 | New |
| T2 | TOY | B | 26.35 | 10,000 | 10,000 | 1,000 | 10,000 | 0 | GS | IndInv | | 0 | New |

FIG. 11

Sponsored Firm Configuration Maintenance

| | | |
|---|---|---|
| Sponsor: | GS | —1914 |
| Firm: | M001 | —1916 |
| Allow Short Sell: | ☑ [?] | —1918 |
| Easy To Borrow Short Sell Only: | ☐ [?] | —1920 |
| Allow Short Sell Exempt on Order: | ☑ [?] | —1922 |
| Maximum order value: | 10,000,000 [?] | —1924 |
| Daily maximum on sells: | 100,000,000 [?] | —1926 |
| Warning Level 1 (%): | 45 [?] | —1928 |
| Warning Level 2 (%): | 65 [?] | —1930 |
| Daily maximum on buys: | 100,000,000 [?] | —1932 |
| Warning Level 1 (%): | 45 [?] | —1934 |
| Warning Level 2 (%): | 65 [?] | —1936 |
| Gross maximum value: | 200,000,000 [?] | —1938 |
| Warning Level 1 (%): | 45 [?] | —1940 |
| Warning Level 2 (%): | 65 [?] | —1942 |

[Submit] [Reset]

| Sponsor▲ | Firm |
|---|---|
| GS | Citi |
| GS | GS |
| GS | LB |
| GS | M001 |
| GS | M002 |
| GS | M003 |
| GS | M004 |
| GS | M005 |
| GS | ML |

FIG. 19

Sponsored Firm Symbol List

2004 — ⦿ New   Update   Delete

2006 — Sponsor:

2008 — Firm:

2010 — Symbol:

2012 — Allow Short Sell: ☐

2014 — [Submit]   [Reset] — 2016

2018:

| Sponsor | Firm | Symbol ▲ | Allow Short |
|---------|------|----------|-------------|
| GS | M001 | BRCM | false |

2020 — [Submit List]   [Reset List] — 2022

2024:

| Sponsor ▲ | Firm |
|-----------|------|
| GS | Citi |
| GS | GS |
| GS | LB |
| GS | M001 |
| GS | M002 |
| GS | M003 |
| GS | M004 |
| GS | M005 |
| GS | ML |
| GS | MS |

2103 — Trade Desk Configuration Maintenance - ...

Trade Desk Configuration Maintenance

| | |
|---|---|
| Trade Desk Id: | ⬚ —2112 |
| Account Required?: | ☑ [?] —2114 |
| Free Float Cap (%): | 10 [?] —2116 |
| NBBO Lower Price Limit (%): | 0 [?] —2118 |
| NBBO Upper Price Limit (%): | 0 [?] —2120 |
| Maximum order value: | 10,000,000 [?] —2122 |
| Daily Maximum on sells: | 100,000,000 [?] —2124 |
| Warning Level 1 (%): | 50 [?] —2126 |
| Warning Level 2 (%): | 75 [?] —2128 |
| Daily Maximum on buys: | 100,000,000 [?] —2130 |
| Warning Level 1 (%): | 50 [?] —2132 |
| Warning Level 2 (%): | 75 [?] —2134 |
| Gross Maximum value: | 200,000,000 [?] —2136 |
| Warning Level 1 (%): | 50 [?] —2138 |
| Warning Level 2 (%): | 75 [?] —2140 |

2104

2106 — [Submit] [Reset] —2108

| Deskid▲ | Desk Name | FirmId | DeskType | DeskState |
|---|---|---|---|---|
| GSProp | Proprietary | GS | PROP | Active |
| GSSales | Block Sales | GS | BLK | Active |

Trading Client Preferences — T0010001 — Microsoft Internet Explorer — 2202, 2204

2200

Trading Client Preferences

New Order Default Setting — 2218 / 2220

| Field | System | OMS |
|---|---|---|
| Sponsor (2222) | SS ▽ | SS ▽ |
| Type (2224) | Frm ▽ ? | ? |
| Invitation Status (2226) | Invite ▽ | Invite ▽ ? |
| Time in Force (2228) | Day ▽ | Day ▽ ? |
| Account (2230) | aaaa | aaaa ? |
| Sponsor Mode (2232) | Preferred ▽ | Preferred ▽ ? |
| Price Protection (2234) | Inside NBBO only ▽ | Inside NBBO only ▽ |
| Negotiation Instruction (2236) | Always ▽ | Always ▽ ? |
| Priority (2238) | Price ▽ | Price ▽ ? |
| Capacity (2240) | Agency ▽ | Agency ▽ |

New Order Default Calculation Settings — 2208

- Minimum volume percentage (2242): 50 | 50 ?
- Negotiation Volume Sensitivity percentage (2244): 5 | 5 ?

Configuration Data — 2210

- Automatically add symbol watches (2246): ☑ ?
- Automatically remove symbol watches (if auto-Added) (2248): ☑ ?
- Average daily volume percentage (2250): 10 ?

Play a sound when... — 2212

- A new negotiation has been recorded (2252): ☐
- An existing negotiation has been changed by the counterparty (2254): ☐
- An alert regarding a negotiation opportunity has been received (2256): ☐ ?
- A trade has occurred (2258): ☐ ?

[ Submit ]  [ Reset ] — 2216, 2214

Trader Price Sensitivity Defaults

◉ New   Update   Delete

Price Range To:     0.00
Price Sensitivity %: 0.00

[Submit]  [Reset]—2312

(BIDS Client Orders):—2322
(OMS Orders):—2324

| Price Range From | Price Range To | System Client Price Sensitivity % | OMS Price Sensitivity % |
|---|---|---|---|
| 0.00 | 10.00 | 0.50 | 0.50 |
| 10.01 | 100.00 | 1.00 | 1.00 |
| 100.01 | 999,999,999.99 | 5.00 | 5.00 |

[Submit List]   [Reset List]—2318

FIG. 23

ELECTRONIC BLOCK TRADING SYSTEM AND METHOD OF OPERATION

RELATED APPLICATIONS

The present application claims priority to provisional application 60/887,507, filed Jan. 31, 2007, which is incorporated in its entirety herein.

FIELD OF THE INVENTION

The present invention relates to systems and methods that are used for trading large blocks of securities. More specifically, the present invention relates to systems and methods that are used for anonymously trading large blocks of securities that includes auto-matching and equitable pricing.

BACKGROUND OF THE INVENTION

It is commonplace for brokers and institutional investors to desire to trade large blocks of securities. This provides the ability to take advantage of market realities and hopefully maximize profits for their clients. Whether the trader is acting for a buyer or seller, there is a strong desire to be able to trade anonymously so that his/her identity or trading intentions as the buyer or seller will not affect transaction pricing. Anonymity is also very important in the large block trading theater because there may not be a single entity with which to transact such large block trade and it may have to be split up among a number of buying or selling entities.

In the past there have been automated, anonymous, and equitable trading systems. For example, U.S. Pat. No. 3,573,747 describes a system that permits institutional investors to communicate anonymously with each other the purpose of arranging block trades from listed over-the-counter securities. The system is run by a computer that controls system operations and permit subscribers to communicate with each other for making large block trades of securities. The system maintains a book of buy and sell offers relating to each of several thousand securities. Offers are entered into an appropriate book as received and the offer is keyed into a sequence table where they are ordered according to the price offered to buy or sell. Both the book and a sequence table are updated when there is a request to print the book for a security. Every system's subscriber has access to the book of any securities.

U.S. Pat. No. 5,136,501 describes an anonymous matching system. The system carries out trades based on variable matching criteria. This criteria includes dynamically variable counterparty credit limits between counterparties. Failure of the credit limit test will block a transaction. The quantity of a permissible match will be the lowest common counterparty credit limit at the best bid ask price for the largest available quantity for automatically completing the potential matching transaction. As such there must be matching on both sides of the transaction.

U.S. Pat. No. 5,727,165 describes an offer matching system that has a timed match acknowledgement. Once a match is made, the host computer sends a match notification message to the key stations of the parties to the transaction. The match notification message includes an "unconfirmed matching transaction" indication for the trading instrument, which is an indication that the match has occurred but the deal has not been confirmed. A match acknowledgment data message must be sent to the computer by the transacting parties so that confirmation of the trade can occur and the match can be completed. There is a timing system associated with a transmission and receipt of the messages associated with the acknowledgment.

U.S. Pat. No. 5,732,400 describes a risk-based system for the purchase of goods. The system includes a financial clearinghouse receiving a registration application for registering buyers and also for receiving requests for goods or services from buyers via a computer network or an electronic medium. The financial clearinghouse makes a dynamic, real-time risk classification of each buyer utilizing an online repository of credit data. The risk classification is not set by either the buyer or the seller but by the financial clearinghouse.

U.S. Pat. No. 5,924,082 describes a matching system for inter-party trading that matches potential parties to a transaction according to trading and ranking information supplied by each potential party then places the parties in negotiation to finalize the transaction. The system includes remote terminals, a communications network, and a matching station. The matching station uses the trading and ranking information from each user to identify potential transactions between counterparties that are mutually acceptable based on the ranking information. Potential counterparties transmit negotiating messages to negotiate some or all the terms of the transaction. The matching station first matches potential counterparties who are acceptable to each other based on trading and ranking information and then enables the counterparties to negotiate and finalize the terms of the transaction.

U.S. Pat. No. 6,131,087 describes a system for automatically identifying matching and near matching buyers and sellers in electronic market transactions. The data that is provided includes linear ranges defining a low point, upper point, and preferred point for each dimension of the offer. Most matching takes place at the preferred points and near match points as determined by the system. The dimensions being considered may include a function identifier, a party identifier, a delivery destination, a product identifier, a price, a payment date, and an offer origination date.

U.S. Pat. No. 6,311,178 describes a computer matching system that carries out auto-matching. This, however, is not an anonymous transaction system. This system uses multiple elements as search criteria for matches. These elements are assigned a weight of importance and each matching result will have a search score indicating a satisfaction level. The system performs ordering and ranking of the matching results according to the search score. The composite scores that have a level greater than a minimum acceptable score level are returned to the user.

U.S. Pat. No. 6,496,851 is directed to managing negotiations between users of a computer network. The system has a mechanism for dealing with a user's misbehavior during negotiations sessions. The system facilitates interactions among users by transmitting a first user's proposal for an activity to another user. A response from the second user includes acceptance, rejection, or counteroffer. Activities include e-commerce and lend itself to a negotiation for goods and services.

U.S. Pat. No. 6,996,541 describes an anonymous trading system that identifies the bids and offers of counterparties while maintaining the anonymity of such potential counterparties and the confidentiality of specific credit limitations imposed by the anonymous potential counterparties. To maintain the anonymity, the system sets a one-bit flag indicating whether the credit limit condition has been satisfied. The system can carry out automated trades if there is sufficient credit between the two transacting parties.

U.S. Pat. No. 7,033,488 describes an anonymous trading system that identifies the best bids and offers from counterparties with which each party is eligible to deal. This patent is related to U.S. Pat. No. 6,996,541.

U.S. Pat. No. 7,024,387 is directed to a system and method of automatically and autonomously buying and selling positions in fungible properties between subscribers. The fungible properties include securities. The system describes an automated system for providing financial information including trading information regarding securities, and conditional or transactional services in real-time via a global computer network. A subscriber can submit a conditional offer to buy or sell. Conditional buy or sell offers are immediately conveyed to all subscribers on the system and such subscribers can accept or counter the offer. An acceptance of or a counteroffer will be communicated immediately to the original offerer and/or other subscribers to the system. The system can be anonymous but it does not have to be.

U.S. Pat. No. 7,035,819 describes an automated trading network. The system continuously collects invisible, anonymous, binding orders and indications of interest to buy and sell specific securities at variable, passively determined prices, and then executes trades based on the collected orders and indications. The prices for the securities may be linked to the national best buy offer ("NBBO"). The trade prices are equal to NBBO mid-point at the time of the trade.

U.S. Pat. No. 7,136,834 describes an electronic trading marketplace that provides for the automated transmission of orders of indication without manual trader intervention. Traders can communicate with the electronic trading marketplace to anonymously negotiate trades of securities using the systems negotiation module. According to the patent, orders that are indications to trade are received by the electronic trading marketplace. These orders are transmitted among the traders in the form of nonbinding indications. Based on these indications, traders at one institution can enter into negotiations with traders at other institutions. The system only considers nonbinding indications.

U.S. Patent Application Pub. No. 2002/0055901 is directed to a broker-to-broker trading system to block trade equities. The system aggregates trading alerts submitted by participating brokers whenever they receive block size trading orders from institutional investors. The negotiations are anonymous between potential counterparties and the executed price is at a current market midpoint. The trading alerts are not orders. Participating brokers satisfy their orders independent of the system. The institutional investors never effect the trade on the system.

U.S. Patent Application Pub. No. 2002/016976 is directed to a system for providing secure electronic brokered transactions. The system makes use of trading programs and their matching rules to communicate with customers using messaging middleware, which makes the system an electronic broker for such customers. The electronic broker device publishes the types of trades it expects to broker.

U.S. Patent Application Pub. No. 2004/0059666 is directed to a computer system for trading securities. The parties are not revealed to each other until the final steps in negotiation. The system also has a mechanism to determine that the prices are reasonable, which includes using NBBO. The parties in determining pricing are expected to process orders fairly and hope that the other party will do the same. As such, the counterparties do not receive information about price movements of the other party. Moreover, the pricing model that is described is based only on negotiations of the parties.

U.S. Patent Application Pub. No. 2007/0055607 is directed to an automated system for matching orders to buy and sell securities at the midpoint of the best bid and best offer ("BBO"). This system receives and stores multiple, computer-generated orders of any size transmitted by algorithmic, program, and other automated trading systems. The transactions provided to a buyer or seller may include instructions for the disclosure of selected message data to one or more market participants. Preprogram response data is received from one of the one or more market participants in response to message data and the preprogram response data is a function of a previously authorized response.

Canadian Patent Application Ser. No. 2,338,145 is directed to a network-based trading system that embraces team investing. The system allows traders to band together and trade as a group. The system obtains account information from customers. This information includes customer risk ratings. Each customer anonymously posts information for trading. The system also has a method of determining if the trading price is fair. The risk assessment information is provided by a customer when he/he first enters the system. All transactions are based on customer risk ratings and trade risk ratings.

Canadian Patent Application Ser. No. 2,394,967 is directed to a fixed income securities trading framework for facilitating a negotiated exchange of fixed income securities. A search engine of the system, in response to a request from a system participant, queries a fixed income database for a set of fixed income securities meeting the criteria that has been specified. On selection of the desired security, the transaction engine facilitates an order execution against posted bids or offers. The transaction engine interacts with the pricing engine during order executed to determine the price of the selected securities. The transaction engine further interacts with the rules database to ensure compliance with preset system rules. Some form of auto-trading may be performed according to the system criteria.

PCT Application Pub. No. WO02095638 is directed to a financial market trading system. The system includes a trading computer, a data store, and one or more trading party sites. The trading party sites communicate with the trading computer over a packet-switch communications network. The system has a trading matching capability. The system also generates trading ticket data with regard to transactions.

The prior art systems that have been discussed do not include the features of the present invention for carrying out automated, anonymous large block trades of securities at fair pricing as will be set forth in remainder of this specification referring to the drawings.

SUMMARY OF THE INVENTION

The present invention is a system and method for making large block trades easier and less costly. The present invention carries out such large block trades, preferably, by anonymous auto-matching based on a determination of equitable pricing for the large block trades. This pricing method of the present invention is designed to eliminate potential inequities associated with "gaming" and "fishing" that takes place in the security trading industry.

The system and method of the present invention transacts trades with two types of orders: Firm Orders and Indicative Orders. A Firm Order, as the term is used herein, is an order in which the volume is committed to be traded. A Firm Order can be auto-matched or pushed into negotiation. An Indicative (or Conditional) Order, as the term is used herein, is an order in which the volume has not been committed to be traded. An Indicative Order cannot be auto-matched but must first be converted to a Firm Order before auto-matching or being pushed into negotiations. It is understood that the term Indicative and Conditional may be used interchangeably.

In order to minimize any advantage obtained by manipulating prices, the present invention bases its auto-matching trading price on a predetermined relationship with the NBBO.

Further, to ensure that the NBBO has not been manipulated and insulate liquidity providers from traders who attempt to time orders to take advantage of sudden changes in the NBBO, the present invention will test the NBBO to ensure that it is fair and valid before allowing orders to auto-match.

To the extent that the security to be traded is illiquid and the pricing test would fail the NBBO tests, such securities would not be available for auto-matching. When such situations occur, the system and method of the present invention will push price discovery to direct negotiations between the interested counterparties.

The present invention also provides for prescreening of counterparties based on a statistical score derived from an analysis of previous behavior on the system. This will provide assurances that the anonymous trading activities conducted by this potential counterparty on the system will be supportive of a legitimate opportunity to trade.

According to the present invention, auto-matching will occur when at least the following conditions are met: (i) the NBBO passes the system tests designed to ensure that the auto-match trade is priced based on a valid and reasonable NBBO, (ii) the two price limit ranges of the counterparties either match or cross, (iii) the minimum volumes of both orders are met by the counterparties, and (iv) one of the two crossed prices must fall within the NBBO.

The system and method of the present invention will invite counterparties into negotiations if at least one of the following conditions exist: (i) the two orders cross or match but the cross price ranges fall outside the NBBO and the disadvantaged party has selected predetermined protections for transacting on the system, (ii) the two orders cross or match but are prevented from auto-matching because the NBBO fails the system tests, or (iii) two orders do not cross or match, but the negotiation sensitivity settings cross for the counterparties.

The negotiations between counterparties with regard to Firm Orders will proceed once the initial prices have been entered by the counterparties. Once these initial prices have been entered, each counterparty's offer will be presented to the other counterparty and the volume will be the overlapped volume of the counterparties. Either counterparty may accept the other side's Firm Offer at any time. If at any time during negotiation the prices match or cross, the system will automatically consummate the trade at the mid-point price between the two counterparties' price limit ranges. The negotiated trade is made without reference to the NBBO.

Indicative Orders are not available for trading according to the system and method of the present invention. In order for Indicative Orders to be traded, they must first be in condition for auto-matching or negotiation. Once that happens, the system and method of the present invention can invite the party issuing the Indicative Order to participate in the system. The system and method of the present invention will invite the party issuing the Indicative Order to change state to a Firm Order if one of the following occur: (i) the counterparty order has a predetermined status indicated, (ii) the system determines that there is an opportunity to trade or negotiate, (iii) the scorecard for each of the counterparties meets the minimum filter requirements for the other party, (iv) one order is a Firm Order and the counterparty with the Firm Order will be informed that the system has invited an Indicative Order to change state to a Firm Order, or (v) both orders are Indicative Orders, then they both will be invited by the system to change their state to Firm Orders.

An object of the present invention is to provide a system and method for effecting large block trades of securities in an automated and anonymous manner that will not be subject to unfair pricing for the trade.

Another object of the present invention is to provide a system and method for effecting large block trades of securities in an automated and anonymous manner that uses filtering based on a counterparty's activity on the system to determine if these counterparties meet each others criteria for trading with each other under the specific circumstances.

A further object of the present invention is to provide a system and method for effecting large block trades of securities in an automated and anonymous manner through the use of Firm and Indicative Orders.

A yet further object of the present invention is to provide a system and method for effecting large block trades of securities in an automated and anonymous manner through the use of Firm and Indicative Orders where pricing is based on features of the NBBO.

These and other objects will be set forth in detail in the remainder of this specification referring to the drawings and the claims.

BRIEF DESCRIPTION OF THE DRAWINGS

FIG. 2 shows an example of trade pricing when the buy and sell prices match and fall within the NBBO.

FIG. 3 shows an example of trade pricing when the buy and sell prices match but are higher than the NBBO.

FIG. 4 shows an example of trade pricing when the buy and sell prices match but are lower than the NBBO.

FIG. 5A shows an example of trade pricing when the buy and sell prices cross and they fall within the NBBO.

FIG. 5B shows an example of trade pricing when the buy and sell prices cross and they are within the NBBO but both are below the NBBO mid-point.

FIG. 6A shows an example of trade pricing when the buy and sell prices cross but they are both above the NBBO.

FIG. 6B shows an example of trade pricing when the buy and sell prices cross but they are both below the NBBO.

FIG. 11 shows an example of an Order Blotter display window for use in the present invention.

FIG. 19 shows an example of a Sponsored Firm Configuration display window for use in the present invention.

FIG. 20 shows an example of a Sponsored Firm Symbol List display window for use in the present invention.

FIG. 21 shows an example of a Trade Desk Configuration display window for use in the present invention.

FIG. 22 shows an example of a Trading Client Preferences display window for use in the present invention.

FIG. 23 shows an example of Trader Price Sensitivity Default display window for use in the present invention.

DESCRIPTION OF THE PRESENT INVENTION

Figure 1:
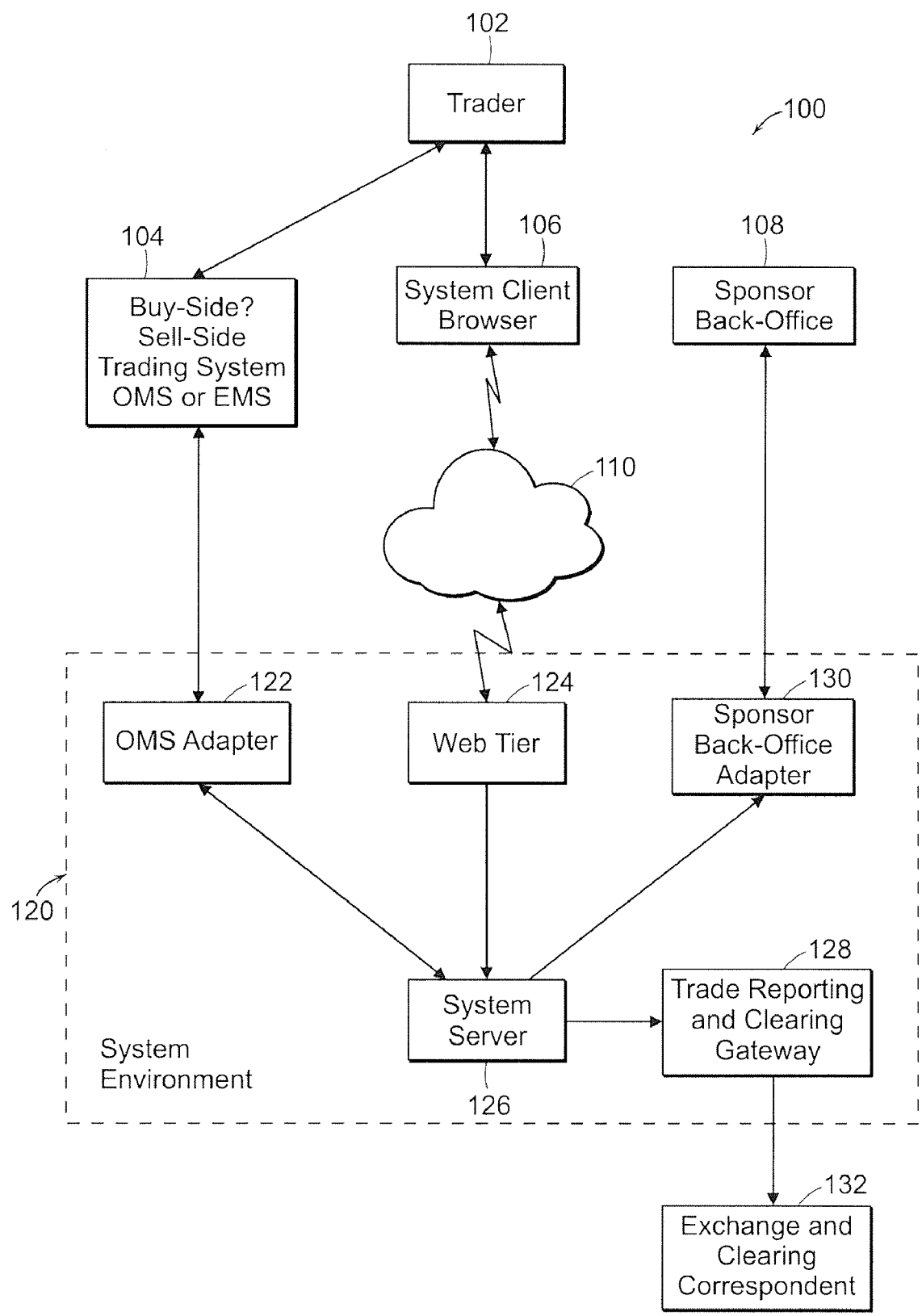
FIG. 1 shows a representative block diagram of the system of the present invention.

The present invention is a system and method for effecting large block trades of securities in an automated and anonymous matter in which fair pricing is carried out using features of the NBBO. When referring to the NBBO, this specification is referring to the term applying to the Securities and Exchange Commission requirement that brokers must guarantee customers the best available ask price when they buy securities and the best available bid price when they sell securities. The NBBO is updated throughout a given trading day to show the highest and lowest offers for a security among all exchanges and market makers.

Using the NBBO, the method of the present invention permits counterparties from the sell-side and buy-side to find prospective counterparties of interest for large block trades. Preferably, trades performed according to the system and method of the present invention are auto-matched. Potential counterparties have the ability to enter Firm or Indicative Orders into the system for effecting trades. Trades on the system of the present invention can only be carried out if they are Firm Orders. Firm Orders can be anonymously (1) auto-matched or (2) pushed to negotiations between the counterparties under certain circumstances as will be described. Indicative Orders cannot be traded on the system of the present invention until such orders have been converted to Firm Orders.

The terms listed below will have the following definitions for use in the description of the present invention:

Anonymity shall mean that a counterparty using the system and method of the present invention is not aware of the identity of the other counterparty.

Buy-side shall mean a fund manager, pension fund, mutual fund, hedge fund or other like entity.

Firm Order shall mean an order in which the volume is committed to trade and a trade will result if a matching order is entered on the system.

Firm Staged Order shall mean the order has been entered on the system through an OMS or EMS, and requires a trader to change the order type to Firm before it can become an actionable order on the system.

Indicative Order shall mean an order in which the volume has not been committed to trade and the trader is not bound to trade the order volume.

Indicative Stage Order shall mean the order has been entered on the system through an OMS or EMS and requires a trader to change the order type to Indicative before it can become an actionable order on the system.

Information Disclosure shall mean information published by the system and method about it particular security.

Invitation shall mean when the system invites an Indicative Order to change to a Firm Order so that it can be traded. An Invitation may also be when the system invites an order that does not cross another order but is within the price and volume ranges of another order for opening a negotiation with such other order.

Leaves Volume shall mean the difference between the order volume and the traded volume.

Order shall mean a vehicle for the trader to communicate his intention to trade.

Scope shall mean the method by which an order is disseminated in the marketplace.

Sell-Side shall mean a registered broker or dealer handling financial instruments such as equities, bonds, derivatives or the like.

Scorecard shall mean a calculation made by the system of the present invention based on the history of a user on the system.

Trade Volume shall mean the accumulated trade order volume, which is incremented by the system as trades occur.

The present invention provides advantages for both the buy-side and sell-side of transactions. With regard to the buy-side, the present invention permits a trader to anonymously place an order in one market that can reach all the sell-side members on the system and allay the concerns about leakage of information. With regard to the sell-side, the present invention provides an ability to participate as either a proprietary trader or a proxy for his/her clients and maintain anonymity. This system, from the standpoint of the sell-side trader, can be restricted to trading only with orders from a particular firm or exposed to all other orders of the system.

Referring to FIG. 1, a representative block diagram of the system of the present invention is shown generally at 100. According to FIG. 1, trader 102, whether a buy-side or sell-side trader, may enter orders into system environment 120 in one of two ways. The first, and preferred, method of entering orders is using system client browser 106. The system client browser may be a conventional personal computer, desktop computer, work station, or the like programmed for use with the system. The system client browser will permit the trader to carry out all trade functions via a secure wired or wireless network. In FIG. 1, communication between system client browser 106 and web tier 124, which is within the system environment 120, is through a wireless network that includes Internet 110. Web tier 124 is conventional web server that processes the Internet signal in a conventional matter for use by system environment 120.

The second method involves a trader's use of his/her existing OMS or EMS, such as buy-/sell-side trading system OMS or EMS 104, for order entry and manipulation. When this is done, both the buy-side and sell-side will communicate via a financial information exchange ("FIX") or other appropriate interface. Communications from unit 104 are sent to OMS adapter 122. The OMS adapter is used to communicate transactions and responses between the traders in the system environment. Messages that may be supported by the OMS adapter include, but are not limited to, "New Order," "Cancel/Replace Order," "Cancel Order," and "Execution Report" messages.

According to the present invention, orders that are transmitted to system environment 120 by the trader using either of the two entry methods are sent to system server 126 that will process the order according to the rules of the system. When trades are effected, information about the trades, besides being sent to the counterparties to the transaction, is forwarded to two locations. This trade information is sent to the trade reporting and clearing gateway 128 and sponsor back-office adapter 130. The trade reporting and clearing gateway 128 transmits trade reports to the Exchange and clearing files to the Clearing Correspondent. With respect to exchange and clearing correspondent 132, the Exchange will report the trades out to the market and the Clearing Correspondent will clear and settle the trades.

Sponsor back-office adapter 130 will transmit trade and order information to sponsor back-office 108 for record keeping. This information will specifically include, but not limited to, trade and order details.

As discussed previously, there are four types of orders processed by the system. These are Firm Orders, Indicative Orders, Firm Staged Orders, and Indicative Staged Orders. Either type of staged order provides traders with a mechanism to send incompletely defined orders to system environment via the OMS adapter knowing that these orders will not be traded before editing. Each order that is processed by the system will have a specific order state, which is represented by a designation that is associated with the order. The order may have preferably, one of ten states. The states are found in Table 1:

TABLE 1

| Order State | Description |
| --- | --- |
| Inactive | This symbol indicates a Staged Firm or Indicative Order that does not interact with other orders on the system. |
| Active | This designation indicates an order that is queued for action in the system of the present invention. If the designation is associated with a Firm Order, it indicates an order that is not close and does not cross any other order within the system. If the designation is associated with an Indicative Order, it indicates an order that is not close and does not cross any other order in the system or the order may be close to or cross another order but is not invited by the system to become a Firm Order. |
| Indicative Invited to Trade | This designation indicates an Indicative Order that has been invited by the system to convert to a Firm Order |
| Indicative Invited to Negotiate | The designation indicates an Indicative Order that has been invited by the system to convert to a Firm Order to initiate a negotiation. |
| Invited to Trade | This designation indicates an Indicative Order that has been invited by the system to convert to a Firm Order. |
| Invited to Negotiate | This designation indicates an Indicative Order that has been invited by a the system to convert to a Firm Order to negotiate. |
| Close | This designation indicates a Firm Order that has a potential negotiation counterparty; however, the counterparty is an Indicative Order. |
| Crossed | This designation indicates a Firm Order that has a possible trade match; however, the counterparty is an Indicative Order. |
| Matched | The designation indicates a Firm Order has been fully matched by one or more counter orders on the system. |
| Post Trade Negotiation | This designation indicates the order has been involved in an auto-match and the two parties are negotiating for an additional trade. |
| In Negotiation | This designation indicates that the order is involved in one or more pre-trade negotiations. |

In order for there to be a trade effected between Firm Orders and Indicative Orders, or two Indicative Orders, there must be an invitation by the system to convert the Indicative Order to a Firm Order so the transaction can be completed. The order states that result from the system inviting an Indicative Order to convert to a Firm Order when the other order is a Firm Order are shown in Table 2:

TABLE 2

| Firm Order Invite Status | Indicative Order Invite Status | Firm Order State | Indicative Order State |
| --- | --- | --- | --- |
| Invite: Yes | Invite: Yes | Crossed Close | Invited to Trade Invited to Negotiate |
| Invite: Yes | Invite: No | Crossed Close | Invited to Trade Invited to Negotiate |
| Invite: No | Invite: Yes | Crossed Close | Active |
| Invite: No | Invite: No | Crossed Close | Active |

According to the four states shown in Table 2, Firm Orders are entitled to see the presence of the Indicative Order regardless of whether the Indicative Order has indicated a positive Invite Status. In the first two states, the Indicative Order will become aware of the Firm Order because it was invited by the system to convert to a Firm Order. In the last two situations in Table 2, the Indicative Order will not be aware of the Firm Order since it had not been invited by the system to convert to a Firm Order.

In order for there to be a trade effected between two Indicative Orders, there must be an invitation by the system to convert to a Firm Order so a transaction can be completed. The order states that result from the system inviting an Indicative Order to convert to a Firm Order when the other order is an Indicative Order are shown in Table 3:

TABLE 3

| Indicative Order Invite Status | Counterparty Indicative Order Invite Status | Firm Order State | Counterparty Indicative Order State |
| --- | --- | --- | --- |
| Invite: Yes | Invite: Yes | Indicative Invited to Trade Indicative Invited to Negotiate | Indicative Invited to Trade Indicative Invited to Negotiate |
| Invite: Yes | Invite: No | Active | Active |
| Invite: No | Invite: Yes | Active | Active |
| Invite: No | Invite: No | Active | Active |

According to the four states shown in Table 3, in the first situation, an Indicative Order can see the other Indicative Order since both have their Invite Status set to "Yes." In the latter three situations, the system requires that both parties have their Invite Status set to "Yes" before the party can see the results of the system's invitation.

According to the system of the present invention, the states that are shown in Table 2 reflect the states of the symbol for a security to be traded in system environment shown 120. The activity state of a symbol is derived from the state of the orders for that symbol. A symbol's primary market state controls its state in the system of the present invention. The relationship of the primary market state and system state are shown in Table 4:

TABLE 4

| Primary Market State | System State | Permitted Actions |
| --- | --- | --- |
| Open | Open (if the NBBO is valid) Negotiation only (if the NBBO is valid) | Auto-matching Pre-Trade Negotiation Post-Trade Negotiation |
| Regulatory Halt | Halt | None |
| Non-Regulatory Halt | Negotiation Only | Pre-Trade Negotiation Post-Trade Negotiation |
| Other State | Closed | None |

The symbol activity state reflects the state of orders for that symbol. The highest order state is published on the system as the symbol's activity. The symbol activity state is sent throughout the system based on visibility of the orders in system. The symbol activity states according to the present invention are shown in Table 5:

TABLE 5

| Symbol Activity | Description |
| --- | --- |
| Inactive | No orders for this symbol are recorded in the system. |
| Active | Invited or active orders are in the system. There are no orders close, crossed, or in negotiation. |

TABLE 5-continued

| Symbol Activity | Description |
|---|---|
| Close | The symbol is comprised of orders that are close, invited, or active. There are no orders that cross or in negotiation. |
| Crossed | The symbol is comprised of orders that are crossed, close, invited, or active. There are no orders in negotiation. |
| In Negotiation | The symbol has at least one pair of Firm Orders in a process of a pre-trade or post-trade negotiation. |

If a trader enters an Indicative Order into the system, it could trigger a symbol activity change from Active to either Close or Crossed. The trader who entered the Indicative Order would know that his order crossed in the market even though his order is not a Firm Order because he would be invited by the system to firm up. If the symbol state is Halted, all outstanding orders for that symbol are cancelled and no new orders are accepted. When a Halt is in place for a symbol that symbol's state is always Inactive.

According to the present invention matching is carried out either automatically or at the conclusion of a negotiation. As stated, the preferred method of trading using the system and method of the present invention is auto-matching. Auto-matching, however, can only take place if the primary market state is "Open" and there is a valid NBBO. In the case of a negotiation, it will be completed when one of the parties accepts, matches, or crosses a counteroffer.

When a Firm Order is received by the system of the present invention from either buy-side or sell-side, there will be an attempt to match the order with an opposing-side order. As part of the selection process, the system and method of the present invention will eliminate selected orders that have restrictions associated with them, for example, legislative restrictions or failing to pass the requirements in the match filter.

The list of orders that result from the first screening will have a trading priority assigned to them based on the trading priority preference defined by the most recent arriving order of the counterparties to the potential transaction. Preferably, the priority will be price or volume, then time. However, it is understood that other criteria could be used and still be within the scope of the present invention.

If trading priority preference is "price," then the associated orders will be given priority for auto-matching based on the (1) best price, (2) largest volume, and (3) earliest effective timestamp. However, if the trading priority preference is "volume," then the associated orders will be given priority for auto-matching based on the (1) largest volume, (2) best price, and (3) earliest effective timestamp.

When two orders are auto-matched, the trade price is calculated according to the pricing methods described below and the volume is the largest overlapped volume. The system of the present invention will iterate through the list of potential counterparties according to their priority attempting to trade as long as there is available auto-match volume.

The price of the trade may be based on two types on matching. The first is when the prices of the counterparties "Match." This means there is an actual price match by the counterparties. When this happens, the trade will proceed with the largest overlapped volume. The second is when the counterparties prices "Cross." This happens when the buy price is higher than the sell price. When this is the case, the trading price will follow the pricing rules set forth below.

According to the pricing method of the present invention, if the order prices match and fall within the NBBO spread, the trade will occur at the match price. This is shown in FIG. 2, generally at 200. In FIG. 2, the applicable NBBO price spread is $40.10-$40.14. The matching buy and sell price is $40.13. Since the matching price is within the NBBO, the trade will be priced at the matching price for the largest overlapping volume of the symbol.

There is a different method of determining the trading price if the buy and sell price match but the matching price is outside the NBBO price spread. This can happen in two cases. The first is the matched price is above the NBBO price spread and the second is when it is below.

Referring to FIG. 3, generally at 300, pricing will be described when the matched price is above the NBBO price spread. If the matched trading price is higher than the NBBO and the buyer indicated that it will permit matches outside the NBBO, the trade price will be the higher matched price and the advantage will go the seller.

Referring to FIG. 4, generally at 400, pricing will be described when the matched price is below the NBBO price spread. If the matched trading price is lower than the NBBO and the seller indicated that it will permit matches outside the NBBO, the trade price will be the lower matched price and the advantage will go the buyer.

It is understood that the buyer or seller, which is not the advantaged party, may indicate that he/she is not agreeable to trade outside the NBBO but if the trade pricing does not satisfy this pricing rule would desire to be pushed into negotiation before canceling the transaction. However, if either party to the transaction indicates no desire to negotiate, then both orders will be returned for future matching if this pricing rule is not satisfied.

Referring to FIGS. 5A and 5B, generally at 500 and 510, respectively, pricing will be described when the buy and sell prices cross, but are within the NBBO price spread. Referring to FIG. 5A at 500, if the buy and sell prices cross, and straddle the NBBO mid-point, the trade price will be at the NBBO mid-point.

In FIG. 5A, the NBBO price spread is $40.10-$40.14 and the buy price is $40.14 and the sell price is $40.10. This straddles the NBBO mid-point at $40.12, so the trade price will be at the midpoint.

Referring to FIG. 5B at 510, if the buy and sell prices cross and both are within the NBBO but are both below the NBBO midpoint, the closest price to the NBBO mid-point will be the trade price. In FIG. 5B, the buy price is $40.11, the sell price is $40.10, and the NBBO mid-point is $40.12. The trade price will be at $40.11 and the advantage will go to the seller. In like fashion, if the buy price is $40.14, the sell price is $40.13, and the NBBO mid-point is $40.12. The trade price will be at $40.13 and the advantage will go to the buyer.

Referring to FIGS. 6A and 6B, trade pricing will now be addressed when the price closest to the NBBO mid-point is outside the NBBO price spread. Referring to FIG. 6A, generally at 600, it is seen that the buy price is $40.17, the sell price is $40.16, and the NBBO mid-point is $40.12, with the NBBO price spread being $40.14-$40.10. If the buyer, in this case, has indicated that it will trade outside the NBBO price spread, then the trade price will be the price closest to the NBBO mid-point. So, in FIG. 6A, the trade price will be $40.16 and the seller will have been advantaged in the transaction because the trade price is higher than the NBBO.

FIG. 6B, generally at 610, it is seen that the buy price is $40.08, the sell price is $40.07, and the NBBO mid-point is $40.12, with the NBBO price spread being $40.14-$40.10. If the seller, in this case, has indicated that it will trade outside the NBBO price spread, then the trade price will be the price closest to the NBBO mid-point. So, in FIG. 6B, the trade price will be $40.08 and the buyer will have been advantaged in the transaction because the trade price is lower than the NBBO.

As indicated above, if the counterparties price match or cross but fall outside the NBBO price spread, auto-matching will only go ahead if the disadvantaged party had previously agreed to permit auto-matching under such circumstances. If the disadvantaged party has not agreed to auto-matching under these circumstances, then the buy and sell orders will be pushed into pre-trade negotiations. Further, such buy and sell orders also will be pushed into pre-trade negotiations, even if the disadvantaged party has agreed to permit auto-matching outside the NBBO price spread if the symbol has a nonregulatory halt in effect as its primary market state.

Since the system and method of the present invention uses the NBBO to some degree to effect fair pricing, it also provides for a method to test whether the NBBO is valid for use. If the system and method determine that the NBBO is not valid even though the two orders are matched or crossed, it will not permit auto-matching of the orders but will push them into negotiations.

A first situation in which the NBBO will be deemed invalid is if its spread is significantly wider than its historical recent average. The system will determine the historical recent average for a symbol by looking at a predetermined number of days worth of history with regard to the symbol and applying a variance percentage to that range. If at any point in time, the current spread of the symbol exceeds that variance amount, the system will consider the NBBO invalid and not permit auto-matching even if there is a match or cross of orders, and the system will push the transaction into negotiation. However, if during the negotiation the NBBO again becomes valid and all other auto-matching criteria is met, the system will auto-match the orders.

Second method of deeming the NBBO invalid is if the system determines that the NBBO price spread is excessive compared to the share price. The NBBO will be deemed invalid even if it falls within the average spread parameters referred to above. For example if a symbol has the share price of $10.00 and the current spread is $2.00, which would be 20% of the share price, the system would likely consider this excessive and, the NBBO would be invalid. In comparison, however, if the NBBO spread for symbol was $10.00 and the share price was $10,000.00, which would be 0.01% of the share price, then the NBBO spread would likely be considered valid. However, it is understood that NBBO testing will be different for each symbol and the system will take the specific symbol into consideration when determining whether or not the NBBO is valid or invalid under this test.

Pre-trade negotiations can be initiated between traders when the orders of the counterparties are (i) both Firm Orders, (ii) both orders pass the counterparty's perspective scorecard filtering, and (iii) the orders are close in both price and volume or close in price or volume, and crossing or overlapping in the other. Order prices are considered "close" if they do not cross but fall within a price buffer of each other. A price buffer for an order is its limit price +/− its price sensitivity. Price sensitivity is expressed in a number of ticks or pennies. For example, a buy order may have a price limit of $40.11 with a price sensitivity of +$0.03; while, a sell order may have a price limit of $40.07 with a price sensitivity of −$0.02. The system can be configured to automatically generate price sensitivity values based on trader preferences.

Order volume ranges are considered "close" if they do not overlap but fall within a volume buffer of each other. For orders with a small volume, the volume buffer maximum is equal to its Leaves Volume. For orders with a large volume, the volume buffer minimum equals the minimum volume minus the volume sensitivity that is expressed in a number of shares of the symbol. The counterparty's order's Leaves Volume must be greater than or equal to this calculated value. The system can be configured to automatically generate a volume sensitivity value based on trader preferences. This feature is a system option.

When a pre-trade negotiation is commenced between two traders, each trader must define a price and volume for his/her starting offer. The volume value cannot exceed the available volume or Leaves Volume. When the stating offers for both trades have been entered into the system, a system will expose the counterparties to these initial positions for negotiation. As to the volume that will be exposed, it will be the lower of the two volumes. The traders will negotiate price and volume through any number of offers and counteroffers until agreement is reached or one of the parties cancel the negotiation.

If during a negotiation, one or both of the orders matches with another Firm Order in the auto-match process or with another parallel negotiation outside the present negotiation, the system will re-create the applicable offer volume for the present negotiation while there is enough remaining volume to meet the minimum volume requirement.

A pre-trade negotiation may be concluded in at least one of four ways. The first is during the negotiations one of the counterparties accepts the offer terms of the other, which results in the trade. Second, the offer presented by either counterparty results in a match or cross which will effect the trade. Third, a counterparty's offer changes the order volume in such a way that it is no longer available for negotiation, e.g., the change results in the volume not being enough to meet the minimum volume requirement of the counterparty. And fourth, one of the orders matches with another Firm Order in the auto-match process or with another parallel negotiation outside this negotiation and there is not enough volume remaining to meet the minimum volume requirement.

Post-trade negotiations are ones that take place after an auto-matched trade and the counterparties desire to negotiate additional trades. Post-trade negotiations may be initiated in at least three situations. The first is when both Firm Orders have Leaves Volumes available. The second is both Firm Orders have the post-trade preference set to Active. Third, both Firm Orders pass the counterparty's filter settings.

In post-trade negotiation, each trader must define the price and volume of his/her starting offer. The volume should not exceed the available Leaves Volume. Once both trades have been entered their starting offers into the system, the system will expose each starting offer to the other counterparty. The volume, however, will be the lower of the two volumes. There can be any number of offers and counteroffers between the traders. Each trader may terminate the negotiation by accepting the counterparty's price and volume, matching the counterparty's offer, crossing the counterparty's offer, or canceling the negotiation.

Referring to FIG. 1, reporting and clearing will be described. System environment 120 has trade reporting and clearing gateway 128 and sponsor back-office adapter 130 that are used for reporting and clearing. The trade reporting and clearing gateway connects to exchange and clearing correspondent 132, and the sponsor back-office adapter connects to sponsor back-office 108.

Trading reporting and clearing gateway 128 performs at least the following two function: anonymity and real-time trade reporting.

The system of the present invention may act as a broker dealer in transactions it handles to set up relationships with clearing correspondents. By establishing this type of arrangement, the anonymity of sponsoring and clearing correspondents may be preserved. For example, a trader and his/her representing clearing correspondents will see the "system" as the counterparty rather than the real counterparty.

A main purpose of the trade reporting is to fulfill at least two types of trade reporting needs: fills and trade reports. Fills are what occur every time there is an auto-match or successful negotiation. More specifically, for each completed transaction, there will be a buy order fill and a sell order fill. Fills are sent in real-time to the respective traders who placed the orders. A copy of each fill is forwarded from system server 126 to sponsor back-office adapter 130 and then to the appropriate sponsor back-office 108. The information on fills that is sent to a sponsor back-office system may be used by that sponsor to perform a number of tasks, which includes risk management.

In order to maintain anonymity and prevent improper actions in the use of the system, a sponsoring broker's front office is not informed of fills unless the order was from that sponsoring broker. This avoids the potential leak of trading intentions.

Trade reports are generated for every match. Trade reports may be sent from system server 126 to trade reporting and clearing gateway 128 is real-time or batch form at certain predetermined intervals. These reports may also be sent from system server 126 to sponsor back-office adapter 130. As such, trade reports may be sent to the trading parties through exchange and clearing correspondent 132 and to their sponsoring back-offices at 108. To preserve anonymity, in each case, the counterparty in these records will be shown as the "system."

The foregoing has provided an overview of the system and method for handling transactions according to the present invention, and the reporting. In light of the foregoing, a more detailed description will now be provided with regard to operation of the system using system client browser 106 to enter orders in system environment 120 for carrying out a novel aspects of the present invention. It is understood, however, that the trader, such as trader shown at 102 in FIG. 1, may enter orders into system environment 120 through his/her OMS or EMS and still be able to use all of the features that are provided by the system client browser. For purposes of describing the system and method of the present invention, it is contemplated that trading may be accomplished by traders through trading desks and sponsors. Therefore, for purposes of understanding the operation of the present invention, the use of the term "trader" may apply to each and all of "traders," "trading desks," or "sponsors" unless specified differently.

Referring to FIG. 1, trader 102 interacts with the system of the present invention using system client browser 106. The system client browser will have a display screen that trader 102 would use for purposes of interacting with system environment 120 via a wired or wireless network. As shown in FIG. 1, a wireless network is shown as Internet 110. However, is understood that any conventional wired or wireless network could be used and still be within the scope of the present invention.

Figure 7:
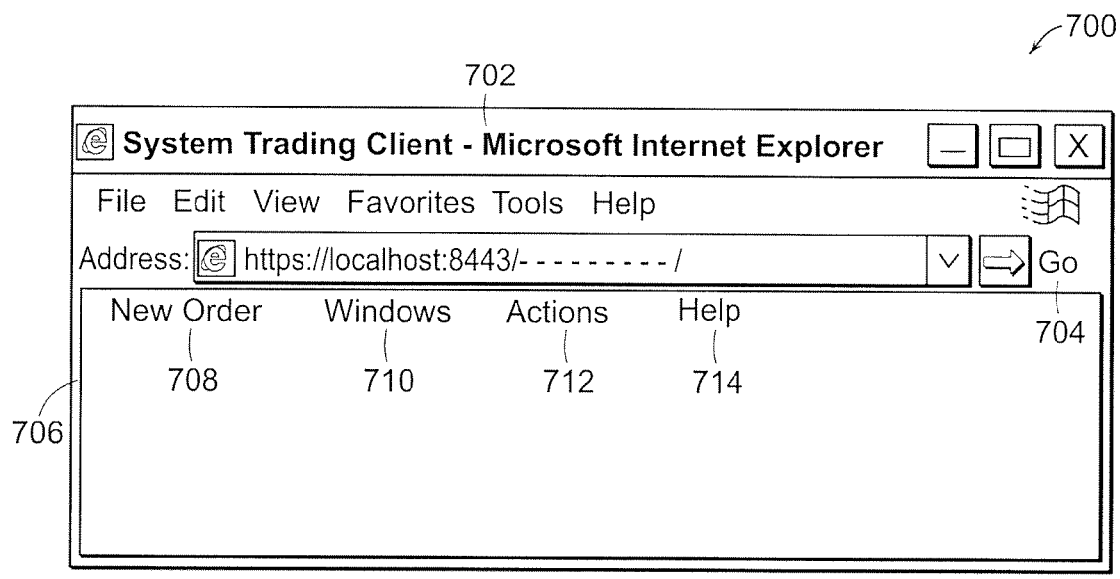
FIG. 7 shows an example of the main display window for use in the present invention.

Referring to FIG. 7, generally at 700, the main screen display is shown for system client browser 106. Display 700 includes display identifier line 702, address line 704, and window 706. Window 706 is for selection icons displayed on it.

The icons shown on window 706 are New Order icon 708, Windows icon 710, Actions icon 712, and Help icon 714. As will be explained in greater detail, New Order icon 708, when activated, will open a new order form; Windows icon 710, when activated, will open a drop-down menu; Actions icon 712, when activated, will open a drop-down menu; and Help icon 714, when activated, will open a conventional Help drop-down menu.

Figure 8:
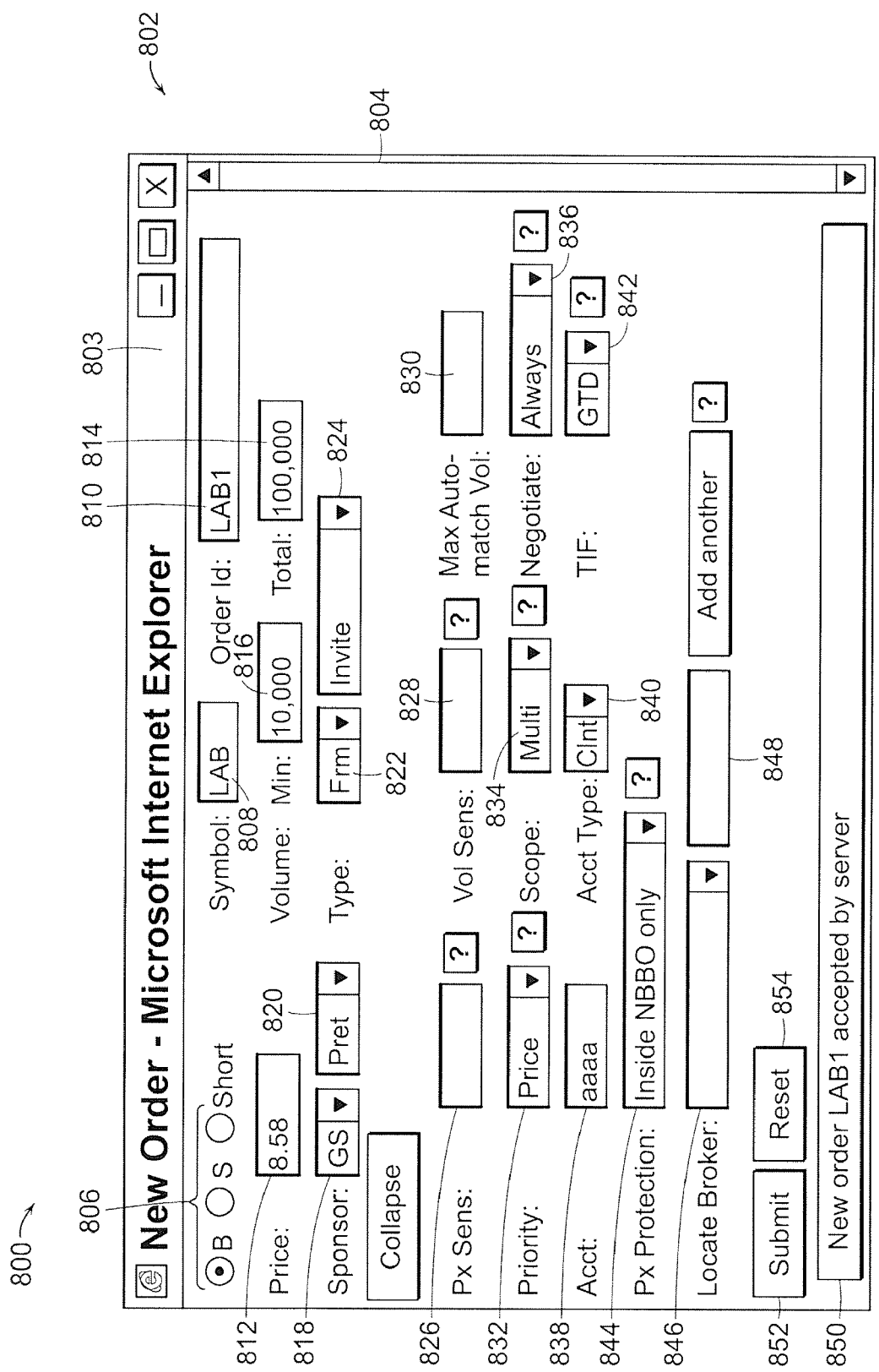
FIG. 8 shows an example of a New Order display window for use in the present invention.

When New Order icon 708 is activated, it will open a New Order form display that is shown in FIG. 8, generally at 800. Referring to FIG. 8, display 802 includes display identifier line 804 and window 804. Window 804 includes fields for the trader to provide information for a new buy or sell order. When a trader desires to place a new order on the system of the present invention, he/she displays 802 and provides the appropriate information. The following information must be provided by the trader in the New Order form or the information must be generated by the system based on the preferences. If the complete set of required information is not provided, the order will not be accepted by the system.

At 806, the trader must indicate whether he is a buyer, designated as "B," a seller, designated as "S," or a short seller, designated as "Short." In referring to "Short," it refers to short sell orders. When this is checked, it indicates that the trader who is making the order does not currently own the stock to be traded.

At 808 of display 804, the trader will enter the symbol of the security for which an order is to be generated. At 810, the order ID is entered and it will be used for identifying the order on the system. The trader will also provide the order price for the symbol at 812 and the total volume at 814. Although not required, the trader may enter at 816 the minimum volume that may be traded in any transaction to fill the total order. The information requested at 806, 808, 810, 812, and 814 must be provided by the trader and typically is not generated automatically by the system based on the preferences if one of these fields is not is not filled out.

At 818 and 820, sponsor information is added. At 818, the sponsor's identifier is entered. The sponsor identifier is to identify the sell-side brokerage firm associated with the order. At 820, the trader enters the sponsorship status. The sponsorship status can be either "Direct," "Preferred," or "None," which is shown in FIG. 8 as "Pref." If the sponsorship status is "Direct," it will mean that the order will be processed based on the selected Scope. If the Scope for the order is "Internal," then it will only interact with other counter orders of the same sponsoring broker. However, if the Scope for the order is "Multi-Broker," the order will interact with other counter orders of the same sponsoring broker or multi-broker orders from any other sponsor. If the sponsor is set to "Preferred," then it will mean the order will be sent though a sponsor and will match against the orders from the same sponsor for seeking matches with orders from other sponsors. If this is set to "None," then the order will match with no preferences.

The type information about the order is entered at 822 and 824. The type of order is entered at 822. The type of order may be one of the following: Firm Order, Indicative Order, Firm Staged Order, or Indicative Staged Order. These have been described previously.

At 824, the Invite Status is entered. The Invite Status selection will control whether the order will be provided to potential counterparties. If the invite status is set to "Invite," the system will invite potential counterparties to firm up their orders for either a trade or negotiation. If the status is set to "Invite to Trade," the system will invite potential counterparties to firm up their orders when a match could occur. If the status is set to "Invite to Negotiate," the system will invite potential counterparties to firm up to enter a negotiation. And finally, if the status is set to "Off," then the order will never be invited or cause the system to invite another order to firm up for trading or negotiation.

At 826, the trader will enter his/her price sensitivity that will be used in negotiations. Price sensitivity, as stated, is a number of ticks or pennies to apply in order to create a price buffer. The price sensitivity field is optional and if a value is not entered, it will be set to zero.

At 828, trader will enter a volume sensitivity value to be used in negotiations. Volume sensitivity, as stated, is the number of shares to subtract from a minimum volume to create the low end of the volume sensitivity range. The volume sensitivity field, like the price sensitivity field, is optional and its value will be set to zero if the trader does not enter a value. The trader in setting his/her order preferences can select a percentage value for price sensitivity and/or volume sensitivity which will be applied automatically by the system rather than the trader needing to enter these values.

At 830, the maximum auto-match volume value is entered. This value will be the volume that is committed to automatically trading on the system. As indicated above, the total volume was entered at 814. This value is the maximum value for the maximum auto-match volume entered at 830. The maximum auto-match volume at 830 can be set at a number less than the total volume value. If the trader does not provide a value at 830, the system will set the value to the Leaves Volume.

At 832, trader will enter the priority selection. As indicated above, the priority selection can be either "Price" or "Volume." If "Price" is selected, potential matches are based first on price, then volume, then the effective time of the counter order. If "Volume" is selected, potential matches are based on first a volume, then price, then the effective time of the counter order.

At 834, at the Scope selection is entered and it will be either "Direct" or "Multi-Broker."

At 836, a negotiation instruction for the orders is entered. The selection here defines the trader's preference for entering negotiations. The trader can select one of five choices. The first is "Never," which indicates the order will never initiate a negotiation. The second is "Pre-Trade," which indicates pre-trade negotiations may be initiated by the order. The third is "Post-Trade," which indicates post-trade negotiations may be initiated by the order as long as there is volume available. The fourth is "Both," which indicates pre-trade and post-trade negotiations may be initiated by the order. The fifth is "Only," which indicates auto-matching should not take place with this order and the only trades that can be made are via pre-trade negotiations.

At 838 and 840, account information is entered. At 838, the trader provides information that identifies on whose behalf the order is being presented. At 840, information is provided to indicate the type of account on whose behalf the orders made. The selection may be either "Client" or "Pro." "Client" (or Agency) would be entered if the order is on the behalf of a customer of a sponsor and "Pro" (or Principal) if the order is on behalf of the sponsor.

At 842, the time in force entry is selected. The time in force selection indicates how long the order is to remain in effect. The selections may be "Day," "IOC" to indicate that the order must be traded on submission or it is canceled, or "GTT" to indicate the order will remain active until a certain time is reached.

At 844, price protection information is entered. There are three selections for this entry. The first is "Allow outside NBBO," which indicates the trade price can be outside NBBO price spread. The second is "Inside NBBO" to indicate that the trade price must fall within the NBBO price spread. The third is "NBBO Mid-point or Better."

The first and second selections have been previously described. With regard to the third, it means that the trade price will be no worse than the NBBO mid-point. For example, the NBBO price spread is $40.10-$40.14 and the NBBO mid-point is $40.12. If the buyer has indicated "NBBO Mid-point or Better" set, then auto-matching would not occur if the seller's trade price was $40.13 and the buyer's trade price was $40.14 because the seller's price is higher than the NBBO mid-point. However, if the seller's price was $40.12 or less, then auto-matching could take place at the NBBO mid-point or a lower value.

At 846 and 848, the trader enters the locate broker information. The information entered at these fields will indicate brokers who have inventory for the symbol at issue that can be made available to cover a short sell order.

Once the information discussed above has been entered into the New Order form shown on display 802, the trader will activate the Submit button 852, which will enter the new order information into the system. If the new order is accepted, the system will return a notification to the trader as shown at 850 in display 802. However, if the trade is not satisfied with the information on display 802, or has submitted information and wishes to submit information for another new order, he/she may activate Reset button 854 to reset the display and enter the new information.

Figure 9:
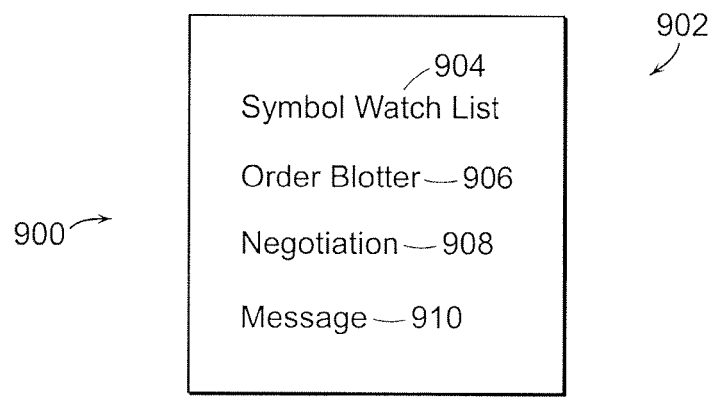
FIG. 9 shows an example of a drop-down menu when the Windows icon in FIG. 7 is activated.

Referring again to FIG. 7, when Windows icon 710 is activated the drop-down menu is provided as shown in FIG. 9, generally at 900. The drop-down menu at 902 has at least four icons. These are Symbol Watch List icon 704, Order Blotter icon 906, Negotiation icon 908, and Message icon 910. The operation of the system and method of the present invention will now be discussed when each of these icons is activated.

Figure 10:
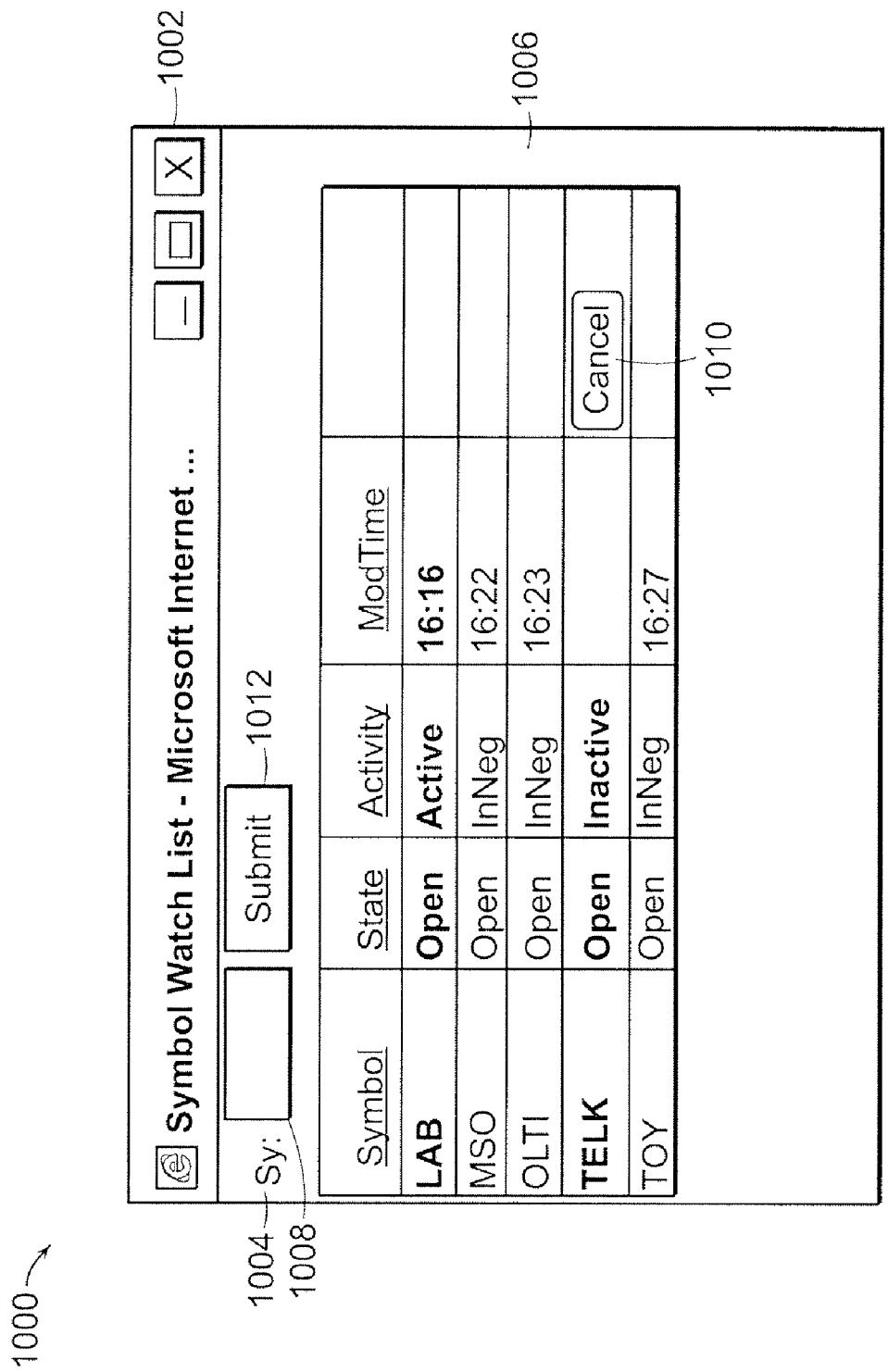
FIG. 10 shows an example of a Symbol Watch List display window for use in the present invention.

When Symbol Watch List icon 904 is activated, the display in FIG. 10 is open. Typically, a trader will place symbols on the symbol watch list so that he/she may watch them to determine if it is appropriate to enter an offer to buy or sell a symbol.

Referring to FIG. 10, display 1000 is provided on system client browser 106. Display 1000 includes display identifies line 1002, symbol entry line 1004, and window 1006. The symbol watch list display provides the trader with an ability to obtain a real-time view of each of the symbols currently on the system of which he/she has an interest and its current trading state activity level. At window 1006, information about each symbol of interest is provided. This information is the symbol for the security, trading state for the security, the activity state of orders on the system, and the modification date, which is the time the symbol trading state became effective.

The trader populates the symbol watch list in one of two ways. The first is to enter the desired symbol at 1008 on symbol entry line 1004 and activate Submit button 1012, or it will automatically be populated when the trader enters an order. Symbols can be removed from the symbol watch list by activating the Cancel button associated with a symbol, such as Cancel button 1010 for the symbol TELK.

Again referring to FIG. 9, if the trader activates the Order Blotter icon at 906, the display at FIG. 11 will be opened. Referring to FIG. 11, generally at 1100, display 1102 has display identifier line 1104, control line 1106, and window 1108. The Order Blotter window provides a list of all of a trader's orders for a predetermined period. This will include all outstanding orders, fully traded orders, and canceled orders. Control line 1106 provides trader with the ability to display all of his orders or just active orders. The window will be updated in real-time as conditions for the listed orders change.

Referring to window 1108, information about a specific trader's orders is provided. The columns of window 1108 display all of the information that was provided in the new order form plus the current trading state of the symbol. The information that is not from the new order form that shows the current status of trading for the particular order are Leaves Volume column 1112, Traded Volume column 1114, State column 1116, # Negotiations column 1118, and Investigate column 1120.

State column 1116 indicates the current state of the order in the system. Here, the state may have one of the states shown in Table 1. # Negotiations column at 1118 will indicate the number of negotiations currently in progress for the indicated order. The negotiations that are counted include both active pre-trade and post-trade negotiations. Activation of the button in this column for a particular order will open the Negotiations window associated with the order. Investigate column 1120 when activated for a particular order requests that a market control entity to investigate events related to that particular order's trading activity.

Again referring to FIG. 11, if Order ID "LAB1" at 1110 is taken, for example, because it refers to the order that was placed through the new order form shown in FIG. 8, generally at 800, the status shows that at the present time 20,000 shares of the 100,000 shares of the symbol have been purchased, which results in a Leaves Volume of 80,000 shares, and there is currently one negotiation taking place.

Figure 12:
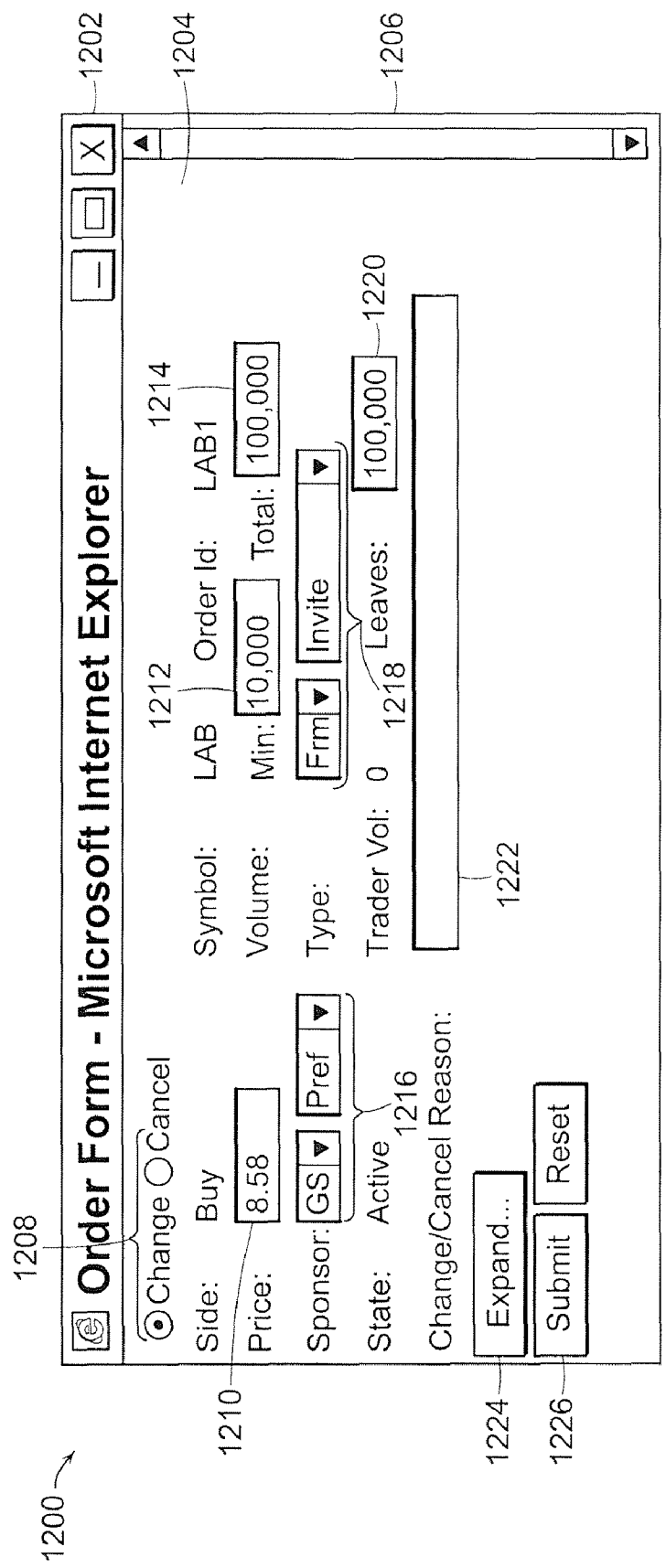
FIG. 12 shows an example of an Order Form display window for use in the present invention.

If the trader activates a particular order in the order ID column, it will open up the Order Form display that is shown in FIG. 12, generally at 1200. Referring to FIG. 12, the Order Form display includes display identifier line 1202, display control line 1204, and window 1206. Referring to the control line 1204, the trader will indicate the type of action he/she wants to take with respect to the order. As seen at 1208, the trader may desire change the values and conditions of the order or he/she may choose to cancel the order altogether.

Referring to window 1206, at 1210, the trader can adjust the price of the order at 1212, the minimum volume at 1212, and the total volume be traded at 1214. Again referring to window 1206, the Sponsor information can be changed at 1216 and the Type information can be changed at 1218. At 1220, the Leaves Volume information will be adjusted based on any changes that would be made to the total volume. Finally, at 1222, the trader can enter the reason for the change or cancellation of the order. This latter entry is not a required field to be completed.

Again, referring to the New Order form shown in FIG. 8, it is to be noted that there is additional information that was provided in display 801 that has been discussed thus far with respect to the Order form display shown at 1200 in FIG. 12. Access to this additional information would be provided for consideration by activation of Expand button 1224. Once all the changes have been made to the order using the Order Form at FIG. 12, the trader will activate Submit button 1226, which will submit the changes to the system.

As indicated above, the Order Form that is shown in FIG. 12 is accessed through the Order Blotter display shown in FIG. 11. However, the Order Form that is shown in FIG. 12 will be automatically provided by the system when a staged order is received by the system from an OMS or EMS, or there is an invitation by the system for an order to convert from an Indicative Order to a Firm Order.

Figure 13:
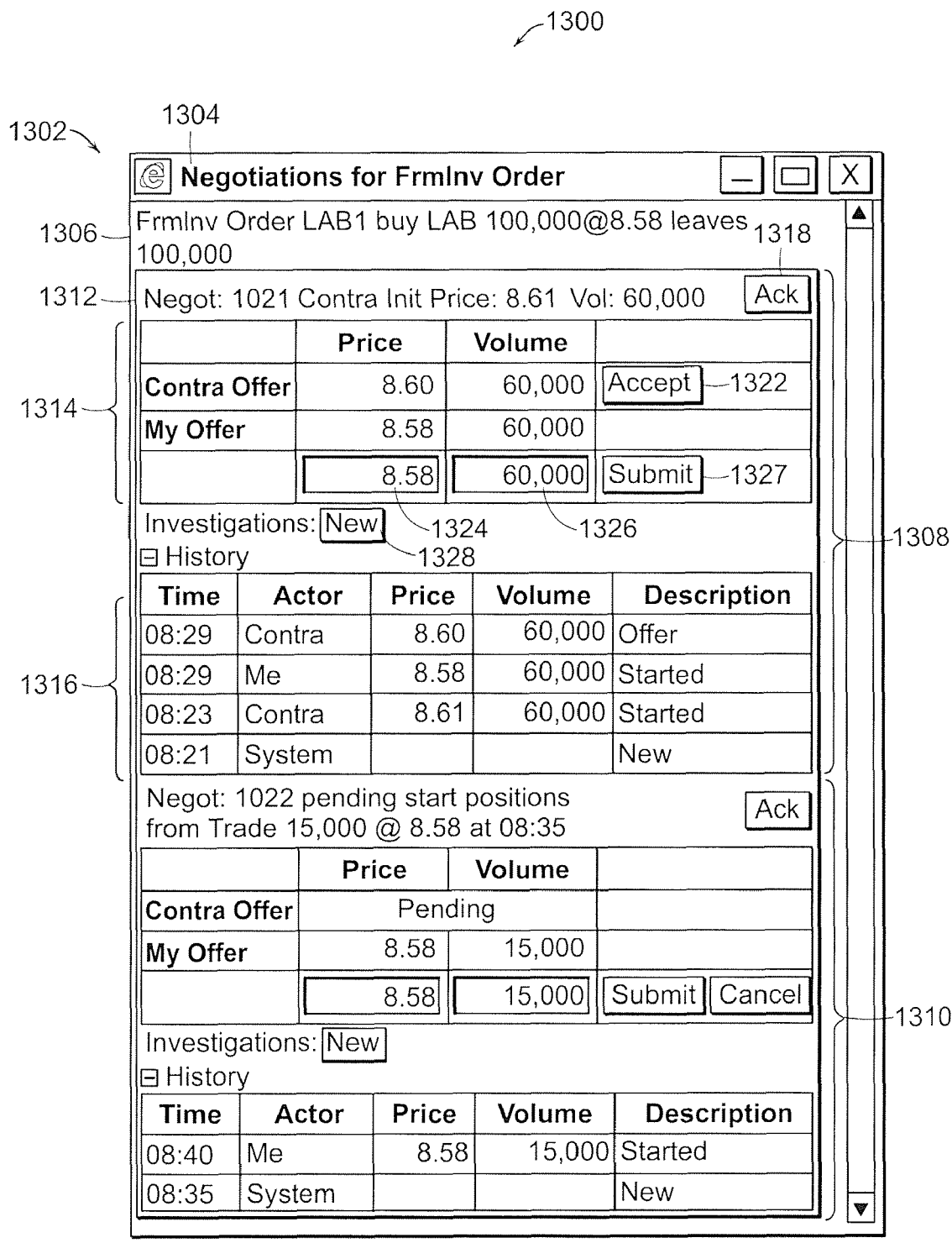
FIG. 13 shows an example of a Negotiations display window for use in the present invention.

Again referring to FIG. 9, if the trader activates the Negotiation icon at 908, the Negotiations window shown at FIG. 13 will be opened. The negotiations window may also be opened, as stated, if the trader activates the button in the # Negotiations 1118 of the Order Blotter display shown in FIG. 11 for a particular order.

Referring to FIG. 13, generally at 1300, the Negotiations window permits the trader to evaluate and communicate offers in real-time to reach a trade. Negotiations that are reported in this window include, as stated, pre-trade and post-trade negotiations.

Each Negotiations window that is opened is directed to a specific order. The window will show each contra order in negotiations with regard to the order. When a negotiation begins, it is placed in a pending status until both counterparties enter their starting offers. After this time, the system puts the orders in negotiation. The conditions for pre-trade negotiations to commence with a Firm Order are (i) the contra order is a Firm Order, (ii) the two orders are close in both price and volume, or close in one and cross/overlap in the other, (iii) both orders have indicated they will allow pre-trade negotiations, (iv) both parties passed the other contra party's filter settings, and (v) the symbol is in a state that permits negotiations, i.e., there is not a Halt in place regarding the symbol.

Further, as stated, post-trade negotiations may be commenced when the following conditions exist: (i) both orders have volume available, (ii) both orders have indicated they will allow post-trade negotiations, and (iii) both parties have passed the contra party's filter settings.

Again referring to FIG. 13, display 1302 has display identifier line 1304 and order identifier line 1306. Display 1302 shows two negotiations. First negotiation is shown generally at 1308 and the second at 1310. Referring to the first negotiation shown at 1308, it has Negotiation identifier line 1312, current offer window segment 1314 and history window segment 1316. The second negotiation at 1310 provides similar information.

Referring to the first negotiation shown at 1308, negotiation identifier line 1312 includes a contra party's starting price and the overlap volume that generated negotiation. It also includes the Acknowledge/Unacknowledge button at 1318. The Acknowledge/Unacknowledge button is activated by the trader to indicate awareness of the existence of the contra offer or changes in negotiations transmitted by the contra party.

Current offer window segment 1314 provides the current offer information with respect to the parties. The segment also provides Accept button 1322 that the trader may activate to accept the current contra offer. At 1324 and 1326, fields are provided for the trader to amend his/her offer for the negotiation. If the trader does change the offer terms, he/she can submit them by activating Submit button 1327. History window segment 1316 provides the negotiation history in descending time order.

Investigations button 1328 may be activated by the trader to investigate a negotiation. When activated, it will cause the Investigation Request display (not shown) to be opened. The investigation request will allow the trader to request investigation of events associated with trading of the order. For example, an investigation may be requested if the trader noticed the order did not trade as expected, there has been improper actions by the counterparty during negotiations, or the trade has a suspect trade price. The configuration of the window will be appropriate for providing the information needed to initiate the investigation.

Figures 14, 15:
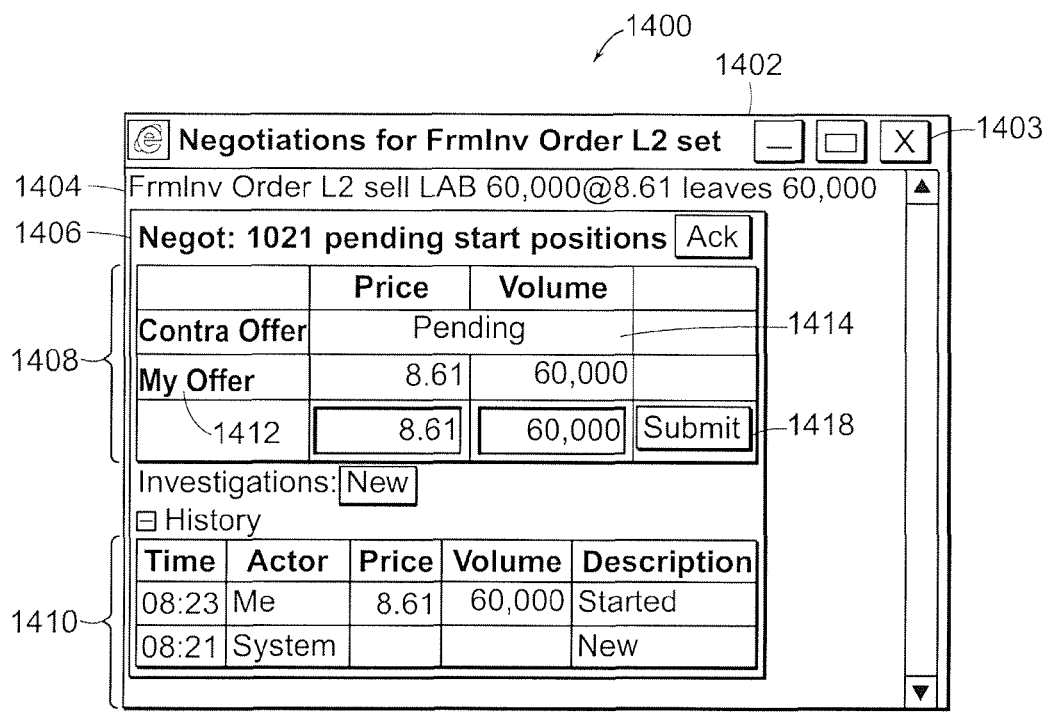
FIGS. 14 and 15 show examples of Negotiation display windows associated with starting a pre-trade negotiation.

Referring to FIGS. 14 and 15, starting a pre-trade negotiation will be described. Referring to FIG. 14, generally at 1400, display 1402 is shown with an offer open for negotiation. Display 1402 has display identifier line 1403, order identifier line 1404, negotiation identifier line 1406, current offer window segment 1408, and history window segment 1410. Order identifier line 1404 indicates that the order is to sell 60,000 shares of "LAB." Since this is the beginning of negotiation and an identified potential contra party has not provided initial terms, then, selling trader's offer is shown at 1412 and a contra offer at 1414 is indicated as "Pending." The system trader's price and volume is the last price and volume that he/she entered into the system for the symbol. The seller's offer is submitted to the system by activation of Submit button 1418. History window segment 1410 reflects the time the negotiation was commenced by the seller and when the seller submitted his/her initial offer to the system to begin a negotiation.

FIG. 15, generally at 1500, shows display 1502. Display 1502 has display identifier line 1504, order identifier line 1506, negotiation identifier line 1508, current offer window segment 1510, information line 1512, and history window segment 1514. It is to be noted at information line 1512 that the system has responded to the seller's offer by providing information that the offer was accepted by the system.

At 1518 of display 1502, a contra party's contra offer is shown. This contra offer is in response to the seller's offer at 1522. If the seller's decides he/she would like to accept the contra offer, Accept button 1520 would be activated. If the seller did not want to accept the contra offer but wants to continue to negotiate, he/she could enter a new offer price at 1524 and volume at 1525. Then, by activation of Submit button 1518, the new offer terms will be entered into the system. History window segment 1514 will reflect the activities that take place in the negotiation until it is either completed or canceled.

Referring to negotiation identifier line 1508, the seller can acknowledge receipt of the contra offer by activating Acknowledge/Unacknowledged button 1516. This acknowledgment will be transmitted to the system where it may be used by the system for many purposes including providing notification either individually or across the system that the seller has received and acknowledged the contra offer. As previous described, the description section at 1526 of history window segment 1514 provides a description of the actions that have taken place.

Figure 16:
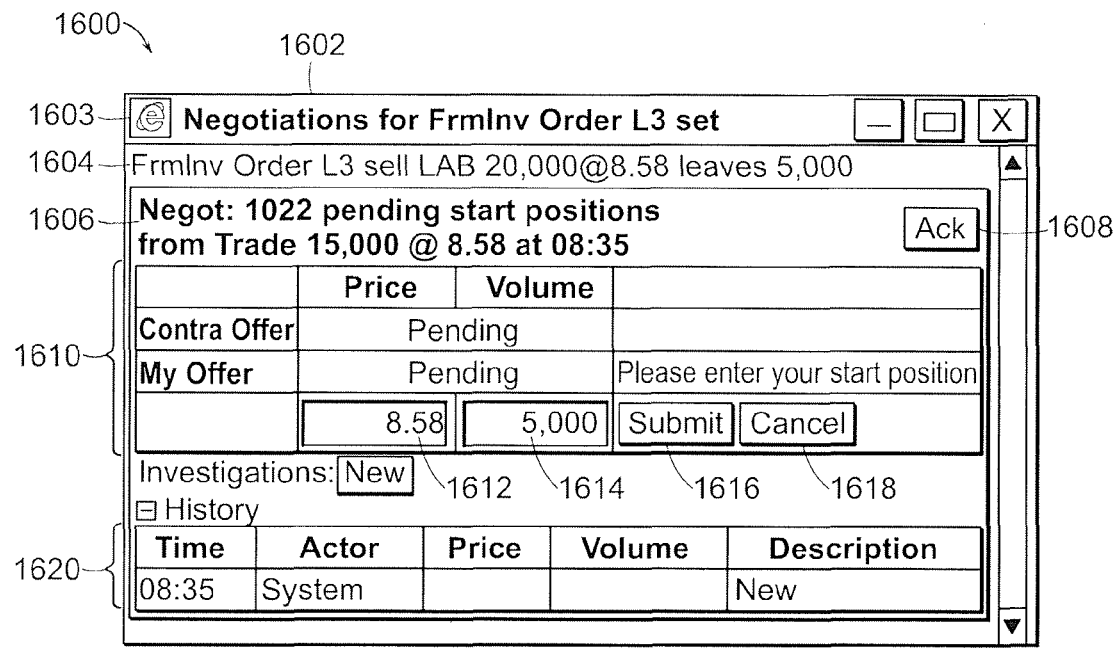
FIGS. 16 and 17 show examples of Negotiation display windows associated with starting a post-trade negotiation.
Figure 17:
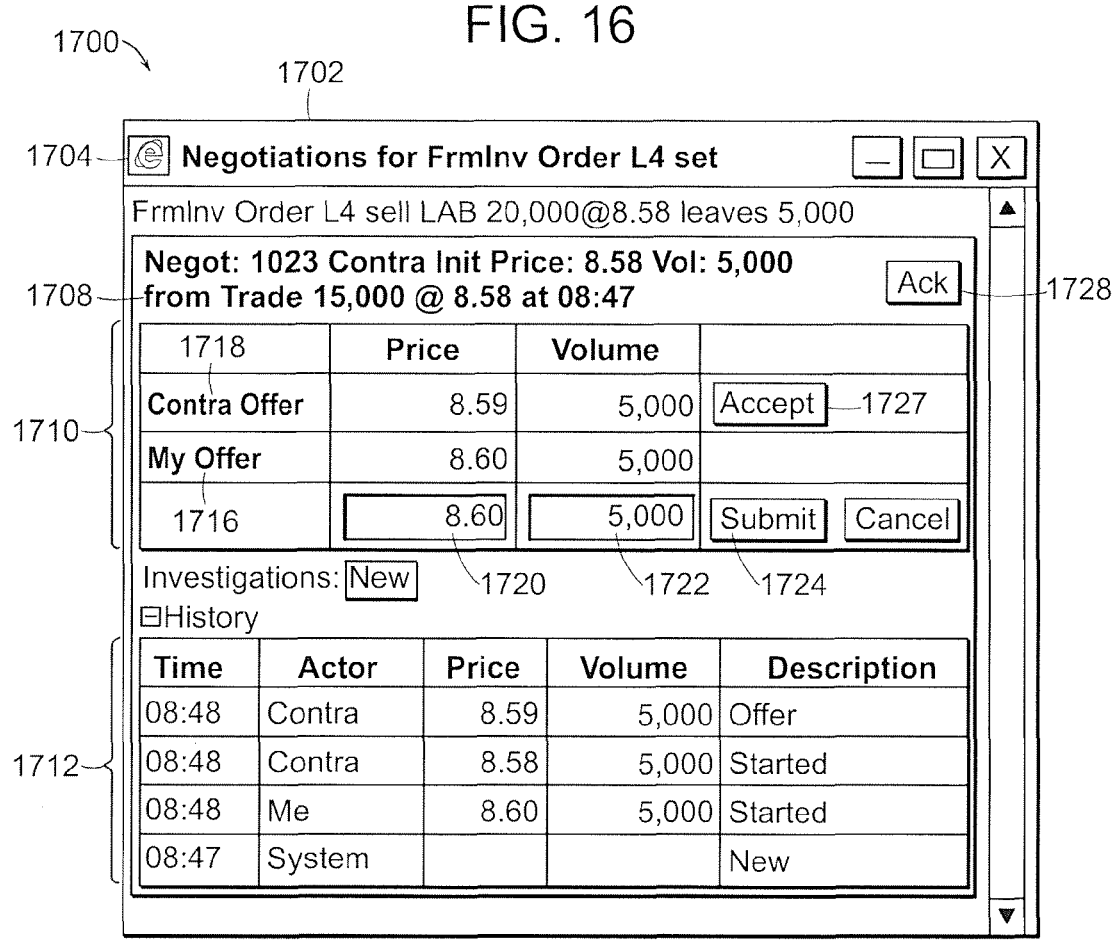

Referring to FIGS. 16 and 17, starting a post-trade negotiation will be described. Referring to FIG. 16, generally at 1600, display 1602 is shown with display identifier line 1603, order identifier line 1604, negotiation identifier line 1606, current offer window segment 1610, and history window segment 1620. Order identifier line 1604 indicates that it is waiting for starting positions from the contra parties to trade 15,000 shares of the security of "LAB" at the price and volume shown. It is a noted, however, that order identifier line 1604, indicates the amount of the "Leaves Volume." By this being a post-trade negotiation transaction, the volume to be negotiated is for the amount of the "Leaves Volume."

Since this is the beginning of negotiation, there has not been the submission of an initial offer by the seller or contra party. It is to be noted that at 1612 and 1614, the initial price and volume amounts for the post-trade negotiations are entered and when Submit button 1616 is activated, the offer will be sent to the system for acceptance and posting. It is further be noted that Cancel button 1618 is available to cancel the post-trade negotiation at any time.

Referring to current offer window segment 1610, prior to the seller submitting the offer shown at 1612 and 1614, the offer price and volume will be shown as "Pending." Similarly, until the original offer is provided and the contra party has an opportunity to enter a contra offer, the volume and price for the contra offer also will be indicated as "Pending."

FIG. 17, generally at 1700, shows display 1702. Display 1702 has display identifier line 1704, order identifier 1706, negotiation identifier line 1708, current offer window segment 1710, and history window segment 1712. If the offer price and volume shown at 1612 and 1614 in FIG. 16 is submitted to the system and accepted, it will be shown as the seller's offer at 1716 in FIG. 17. At 1718 in FIG. 17, a contra party's offer price and volume are shown. If the seller desires to accept the contra offer, he/she would activate the Accept button at 1727. If, however, the seller does not want to accept the contra offer and wants to continue to negotiate, he/she she could enter a new offer price at 1720 and volume at 1722. Then, by activation of Submit button 1724, the new offer by the seller would be entered into the system. History window segment 1712 reflects the activities that take place in the negotiation until it is either completed or canceled. Cancellation of the negotiation would be carried out by activation of Cancel button 1726.

Similar to the negotiation identifier line 1508 in FIG. 15, the seller can acknowledge receipt of the contra offer by activating Acknowledge/Unacknowledged button 1728. This acknowledgment will be transmitted to the system where it may be used by the system for many purposes including providing notification either individually or across the system that the seller has acknowledged receiving the contra offer.

As discussed above the respect to FIG. 11 and shown in FIGS. 12-17, there is an Investigations button which when activated will cause a screen to open for a party to enter an investigation request. The information that may be associated with the investigation request includes any or all the following information: (1) reference to the order that triggered the request, (2) reference to the negotiation that triggered a request, (3) reference to trade that triggered the request, (4) the date and time of the request, (5) a description of the problem, (6) the time the request was investigated, (7) the description of the resolution of the problem, and (8) the current state of the investigation. The state of the investigation will be either Open, Active, or Closed.

The system also will generate appropriate Alerts to indicate to each trader either the completion of events or events that need his/her attention. These Alerts may be audible or visual, e.g., flashing screen element.

The system and method of the present invention gather significant amounts of data regarding the trades that take place over the system. The statistics that are generated from this information is used to provide filters to screen out underperforming counterparties, and is available for generating reports about the data and operation of the system. Table 6 below provides at least some of the data that may be collected by the system. After providing the table below that covers the information that is gathered, filtering for counterparties on the system will be described.

TABLE 6

| Type | Area | Data Collected |
|---|---|---|
| Indicative Orders | Conversion rate from Indicative to Firm Orders | 1. Percentage of Indicative Orders canceled.<br>2. Conversion rate to Firm when invited to firm up by the system.<br>3. Conversion rate to Firm when invited to firm up by the system. |

TABLE 6-continued

| Type | Area | Data Collected |
|---|---|---|
| | | 4. Conversion rate to Firm when invited to negotiate by the system. |
| | | 5. Conversion rate to Firm when invited to negotiate by the system. |
| Firm Orders | N/A | 1. Conversion rate from Firm to Indicative Orders. |
| | | 2. Percentage of Firm Orders canceled. |
| Pre-Trade Negotiations | Negotiations that were caused by being "Close" | 1. Average duration of successful pre-trade negotiations. |
| | | 2. Percentage of pre-trade negotiations successfully completed. |
| | Negotiations that were caused by being "Crossed" with auto-match off and preferences | 3. For unsuccessful negotiations:<br>a. Percentage of failed pre-trade negotiations due to trader moving his price away.<br>b. Percentage of failed pre-trade negotiations due to the trader canceling the order.<br>c. Percentage of failed pre-trade negotiations due to the counterparty moving his price away.<br>d. Percentage of failed pre-trade negotiations due to the counterparty canceling the order.<br>e. Percentage of failed negotiations due to a competing negotiation.<br>f. Percentage of failed negotiations due to an auto-match. |
| Executions | N/A | 1. Percentage of Firm Orders traded.<br>2. Percentage of trades that were auto-matched.<br>3. Pre-trade negotiated trade data:<br>a. Percentage of pre-trade negotiations at a worse price.<br>b. Percentage of pre-trade negotiations at a better price. |
| Post-Trade Negotiations | N/A | 1. Percentage of auto-matches that went into post-trade negotiations.<br>2. Percentage of post-trade negotiations that were successful.<br>3. Post-trade negotiated trade data:<br>a. Percentage of post-trade negotiations completed successfully when the maximum value has already been traded.<br>b. Percentage of post-trade negotiations traded at a worse price when the maximum volume has already been traded.<br>c. Percentage of post-trade negotiations traded at a better price when the maximum by volume has been ordered and traded.<br>d. Percentage of post-trade negotiations completed successfully when the maximum value has yet to be traded.<br>e. Percentage is post-trade negotiations traded at a worse price when the maximum volume has yet to be traded.<br>f. Percentage of post-trade negotiations traded at a better price when the maximum volume has yet to be traded.<br>4. Average duration of successful post-trade negotiations.<br>5. For unsuccessful post-trade negotiations:<br>a. Percentage of post-trade negotiations where the trader canceled negotiation while it was pending.<br>b. Percentage of post-trade negotiations where the counterparty canceled negotiation while it was pending.<br>c. Percentage of post-trade negotiations where the counterparty canceled negotiation while it was active. |

As mentioned previously, the system and method of the present invention calculates a scorecard for use in filtering to determine whether to permit a counterparty into negotiations. These scorecards do not apply if there is an auto-match. The trader in setting his/her preferences will indicate the score value below which he/she will not enter into negotiations with a counterparty. The intent of scorecard filtering is to reward "good" traders and not reward "bad" traders as these entities are defined by the trader's preferences. Therefore, to extent that a trader is deemed a "bad" trader by another, the "bad"

trader will seldom or never be invited to convert an Indicative Order to a Firm Order to participate in a trade or negotiation until that trader's behavior changes for the better.

Table 7 below addresses the negotiation situations in which a trader's behavior is filtered for purposes of determining whether or not he/she should be permitted to enter into negotiations. The filter column for each counterparty in Table 7 should be checked by the appropriate counterparty before determining whether to enter in with negotiations with a particular counterparty. It is to be noted that the system can provide the filtering information without destroying system anonymity.

TABLE 7

| Order Situation: Close or Cross | Counterparty A | | Counterparty B | |
|---|---|---|---|---|
| | Order Type | Filter | Order Type | Filter |
| Close | Firm | CLNS | Firm | CLNS |
| Close | Firm | FUTNF | Indicative | CLNS |
| Close | Indicative | FUTNI, CLNS | Indicative | FUTNI, CLNS |
| Crossed: Symbol with Auto-Match OFF | Firm | N/A (Auto-Match) | Firm | N/A (Auto-Match) |
| Crossed: Symbol with Auto-Match ON | Firm | CRNS | Firm | CRNS |
| Crossed: Symbol with Auto-Match ON | Firm | FUTTF | Indicative | N/A (Auto-Match) |
| Crossed: Symbol with Auto-Match ON | Indicative | FUTTI | Indicative | FUTTI |
| Crossed: Symbol with Auto-Match OFF | Firm | FUTTF, CRNS | Indicative | CRNS |
| Crossed: Symbol with Auto-Match Off | Indicative | FUTTI, CRNS | Indicative | FUTTI, CRNS |

The following table, Table 8, provides a description of the filters that are represented by acronyms in Table 7:

TABLE 8

| Filter | Description |
|---|---|
| CLNS | Information from negotiations that stated as "Close": <br> a. Average duration of successful negotiations <br> b. Successful negotiation rate <br> c. Unsuccessful rate details <br> d. Cancellation rate <br> e. Moved away right |
| CRNS | Information from negotiations that stated as "Crossed": <br> a. Average duration of successful negotiations <br> b. Successful negotiation rate <br> c. Unsuccessful rate details <br> d. Cancellation rate <br> e. Moved away right |
| FUTNF | Firm Up To Negotiate by a Firm Order: <br> a. Conversion rate to firm up to negotiate when requested by the system when the other order is a Firm Order. |
| FUTNI | Firm Up To Negotiate by an Indicative Order: <br> a. Conversion rate to firm up to negotiate when requested by the system when the other order is an Indicative Order |

TABLE 8-continued

| Filter | Description |
|---|---|
| FUTTF | Firm Up To Trade by a Firm Order: <br> a. Conversion rate to firm up to trade when requested by the system when the other order is a Firm Order |
| FUTTI | Firm Up To Trade by an Indicative Order: <br> a. Conversion rate to firm up when invited when requested by the system when the other order is the system. |

The system and method of the present invention also contemplates the use of a filter related to post-trade negotiations. The Post-Trade Negotiations (PTNS) filter considers the following with respect to the counterparty: (1) the average duration of negotiations, (2) the negotiation success rate when auto-match filled the maximum volume, and (3) the negotiation success rate when the auto-match did not fill the maximum volume.

The actual scorecard calculation may be on a trader basis or based on trading desk transactions. It either case, the scorecard value is calculated based on at least a selected number of transactions that are specified in system configuration data. However, a trader may select to ignore the scorecard process altogether and it will still be within the scope of the present invention.

To provide some perspective on the trending of trading behaviors, the scorecard may be calculated on a weighted average basis taking into account how recently events occurred. For example, the scorecard calculation may be weighted higher with respect to more recent transactions than ones that took place a while ago. As a specific example, if 100 transactions fell within the time window for consideration for the scorecard, the most recent 25% (transactions 76-100) may have a weighting factor of "5," the next most recent 25% (transactions 51-75) may have a weighting factor of "3," and the oldest 50% (transactions 1-50) may have a weighting factor of "1." However, it is understood that other weighting factors could be used with other percentages of transactions being considered and still be within the scope of the present invention.

Taking the example of weighting factors shown above, if there was a review of the trading transactions during four time segments (TS) and at TS1, the earlier TS, there were no transactions that took place for scorecard purposes but in the remaining three time segments sequentially after that, TS2, TS3, and TS4, there were the type of transactions taking place that are under consideration for filtering purposes, then the scorecard based on 100% for the occurrence of at least one transactions of this type and 0% for no occurrence, the following would be the calculation:

$$\frac{(100*5)+(100*3)+(100*1)+(0*1)}{10}=90$$

Noting the calculation above of a weighted score and value above, if a counterparty would accept counterparty scorecard values of 85 and above, the scorecard filter would be passed and the trading activity would commence. It is understood that weighted averages method is not the only one that could be used to calculate a scorecard value, and other methods may be used and still be within the scope of the present invention.

Figure 18:
FIG. 18 shows an example of a System Configuration display window for use in the present invention.

When a trader, sponsor, or trading desk (through which a number of traders may access the system) access on the system for making trades, the system must be configured. Referring to FIG. 18, generally at 1800, the system configuration display screen is shown. Display screen 1802 has display identifier line 1804, information segment 1806, Submit button 1808, and Reset button 1810. The information that is required to be provided by the trader, trading desk or sponsor is shown at 1806. The information shown in 1806 is required by all system users.

At 1812, a system user is required to provide "Account Required" information. If the appropriate box is not checked, it will indicate that the trading desk configuration settings will have precedence over the trader settings. If the appropriate box is checked then the trader setting will override the trade settings. At 1814, the system user will input the length of time to maintain transaction history before archiving. At 1816, the user indicates whether he/she desires to disable the scorecard feature. If this is not checked, it will indicate that the user will conduct negotiations without consideration of the behavior of potential counterparties.

At 1818, the system user provides the number of months as a period of time for considering orders for making scorecard determinations. At 1820, system user provides the maximum number of orders in considering in calculating scorecard determinations.

At 1822, the system user indicates by checking the appropriate box that he/she desires to report whether the buyer and seller clearing correspondents, and source types are the same to an appropriate authority. At 1824, the system user indicates whether or not he/she desires to have all of their trades consolidated for reporting purposes.

At 1826, the system user indicates the maximum number of ticks or pennies that the NBBO can be crossed and still be valid for purposes of effecting a trade. At 1828, the user indicates the price at which he/she considers a symbol to be classified as a small price stock. This will be a monetary value. At 1828, the user provides the number of decimals permitted in the price of a symbol defined as a small price stock.

Once the information is entered on the system configuration display at 1806, the system user will activate Submit button 1808 to enter the information into the system. If at the system user is unhappy with the information that is to be submitted, or has submitted information and would like to clear the display to enter different information, he/she can activate Reset button 1810 to clear the information so new information may be added.

Although the information shown at 1806 has been described, is understood that other information may be submitted for each system user and still be within the scope of the present invention. For example, the system may request the system user to provide the following:

TABLE 9

| Configuration Item | Description |
|---|---|
| Threshold Number of Orders | The minimum number of orders that must have been executed before the scorecard filter can be applied. There will be a minimum value for each scorecard item. |
| Default Negotiation Lower Price Limit Percentage | This will be the default value for the negotiation lower price limit percentage. |
| Default Negotiation Upper Price Limit Percentage | This will be the default value for the negotiation upper price limit percentage. |

TABLE 9-continued

| Configuration Item | Description |
|---|---|
| Maximum Negotiation Lower Price Limit Percentage | This is a maximum lower price limit value that can be configured. |
| Maximum Negotiation Upper Price Limit Percentage | This is the maximum upper price limit value that can be configured. |

As discussed previously, "Sponsors," which are sell-side brokerage firms, are identified on the New Order Form at FIG. 8 and the Order Form at FIG. 12. Each sponsor shall submit configuration information in order to be authorized to access the system. The information that is to be provided by the sponsor includes, but is not limited to, what is shown in Table 10:

TABLE 10

| Configuration Item | Description |
|---|---|
| Maximum Order Value | This the maximum value that orders sponsored by the Broker cannot exceed. All orders above this maximum will be rejected by the system. This maximum value is determined by multiplying the order price times the order volume. |
| Daily Maximum Value on Sells | This is the maximum value of sell trades for the sponsor in a given trading day. The sponsor may also set Level 1 and 2 warnings, which are percentages of reaching the maximum value. |
| Daily Maximum Value on Buys | This is the maximum value of buy trades for the sponsor in a given trading day. The sponsor may also set Level 1 and 2 warnings, which are percentages of reaching the maximum value. |
| Daily Gross Maximum Value | This is the maximum value of the buy and sell trades for the sponsor in a given trading day. The sponsor may also set Level 1 and 2 warnings, which are percentages of reaching the maximum value. |
| Maximum Number of Locate Brokers On an Order | This is the maximum number of locate brokers allowed to be specified on an order. |

There is certain configuration data that may be needed for application to all traders that are entering orders through a sponsor. This information is provided by the sponsor. There are at least three lists that apply for this purpose. There is an Easy-To-Borrow List that lists the symbols that the sponsor will allow short sell orders without the need of specifying a locate broker. The second is the Threshold Symbols Exception List that lists the symbols that the clearinghouse has restricted short selling for specific reasons. However, the sponsor can override this restriction and permit selling for the traders acting through them. Orders for these symbols must have the sponsor as a locate broker. And the third list is the Restricted Symbol List that has order symbols that will be rejected if entered into the system.

Referring to FIG. 19, generally at 1900, a display is shown for the submission of sponsor configuration information for each trader the sponsor represents. Display 1902, includes display identification line 1904, display information segment 1906 and sponsor/firm data at 1908.

At information segment 1906, the sponsor provides self-identification information at 1914. At 1916, the sponsor provides the information regarding firm (trader) it represents. At

1918, the sponsor indicates whether or not the firm is permitted to enter short sell orders. At 1920, the sponsor indicates whether the firm can only enter into short sell orders if the symbol appears on its Easy-To-Borrow List. At 1922, the sponsor indicates whether the firm is permitted to indicate a short sell order as exempt.

At 1924, sponsor indicates indicates the maximum order value that cannot be exceeded for the firm indicated above. This would be the order price times order volume, which will be compared to this maximum. If this maximum is exceeded, the orders will be rejected.

At 1926, 1928, and 1930, sponsor enters information with regard to daily sells for the firm indicated at 1916 above. At 1926, the sponsor provides the maximum value of sell trades for given trading day. This does not refer to orders. At 1928 and 1930, the sponsor sets two level warnings to indicate when specified percentages of the daily sell limits are reached for the firm. Once the firm reaches the maximum limit, the system will cancel all remaining sell orders in the system for that firm.

At 1932, 1934, and 1936, sponsor enters information with regard to daily buys for the firm indicated at 1916 above. At 1932, the sponsor provides the maximum value of buy trades for given trading day. This also does not refer to orders. At 1934 and 1936, the sponsor sets two level warnings to indicate when specified percentages of the daily buy limits are reached for the firm. Once the firm reaches the maximum limit, the system will cancel all remaining buy orders in the system for that firm.

At 1938, 1940, and 1942, sponsor enters information with regard to gross daily buys and sells for the firm indicated at 1916 above. At 1938, the sponsor provides the maximum value of trades for given trading day. This also does not refer to orders. At 1940 and 1942, the sponsor sets two level warnings to indicate when specified percentages of the gross daily buy and sell limit are reached for the firm. Once the firm reaches the maximum limit, the system will cancel all remaining buy and sell orders in the system for that firm.

If the sponsor is satisfied with that information at 1914-1942, he/she can submit this information to the system by activation of Submit between 1910. However, if the sponsor wishes to reset the information because he/she is not satisfied with it or wants to clear the display to add new information after an earlier submission, the sponsor would activate Reset button 1912.

The sponsor also submits information to the system with regard to each symbol for which it represents a firm (trader). Referring to FIG. 20, generally at 2000, the sponsor's submission of the Sponsored Firm Symbol List will be discussed. At 2002, the display identifier line is shown. Similar to FIG. 19 at 1908, FIG. 20 at 2024 provides a list of firms that the sponsor represents.

At action line 2004, the sponsor indicates what is being submitted. It may be either a new submission to the list, an update of an existing symbol on the list, or deletion of the symbol from the list.

At 2006, sponsor enters its identification and at 2008 the firm's identification. The symbol at issue is listed at 2010 and at 2012 the sponsor indicates whether or not the firm will be allowed to short sell.

If the sponsor is satisfied with the information at 2004-2012, he/she can submit this information to the system by activation of Submit button 2014. However if the sponsor wishes to reset the display information for any reason he/she would activate Reset button 2016.

At 2018, the sponsor can provide list of firms and symbols it sponsors. This list may be submitted the system by activation of the Submit List button 2020. Again as before, if it is desired to reset the display information for any reason, the sponsor will activate Reset List button 2022.

To the extent that the system accommodates a trading desk, which will define the attributes for its member firms for interaction with the system, there is a need for the trading desk to provide configuration information for this purpose. This information will be submitted to the system and govern the activity of its members with respect to system interaction.

Referring to FIG. 21, generally at 2100, a display is shown for the submission of trade desk configuration information. Display 2102 includes display identifier line 2103, information segment 2104, and at 2110 the other trade desks that exist for a particular firm of which this trading desk is part.

At 2112, the trading desk provides its identification information. At 2114, trade desk is required to indicate whether Account Required is appropriate. This applies only if the same setting in FIG. 18 for the system configuration is set to "No." At 2116, the trading indicates the percentage of freely floating shares that are applied to the upper daily limit of the average daily volume percentage to get the maximum value.

At 2118, the trading desk provides the negotiation lower price limit percentage. If the negotiation offer price deviates such that it is below this percentage then trader must reenter the price. At 2120, the trading desk provides the negotiation upper price limit percentage. If the negotiation offer price exceeds the NBBO by greater than this price in negotiation the offer is rejected.

At 2122, the trading desk enters the maximum order value for a single order. The maximum order value is determined by the price times the volume of the order. If value is exceeded, the order will be rejected.

At 2124, 2126, and 2128, the trading desk enters information with regard to daily sells for the trading desk. At 2124, the trading desk provides the maximum value of sell trades for a given trading day. This does not refer to orders. At 2126 and 2128, the trading desk sets two level warnings to indicate when specified percentages of the daily sell limits are reached by the trading desk. Once the trading desk reaches the maximum limit, the system will cancel all remaining sell orders in the system for that trading desk and not permitted it to enter any more.

At 2130, 2132, and 2134, the trading desk enters information with regard to daily buys for the trading desk. At 2130, the trading desk provides the maximum value of buy trades for given trading day. This also does not refer to orders. At 2132 and 2134, the trading desk sets two level warnings to indicate when specified percentages of the daily buy limits are reached for the trading desk. Once the trading desk reaches the maximum limit, the system will cancel all remaining buy orders in the system and not permit it to enter anymore.

At 2136, 2138, and 2140, the trading desk enters information with regard to gross daily buys and sells for trading desk. At 2136, the trading desk provides the maximum value of gross trades for a given trading day. This also does not refer to orders. At 2138 and 2140, the trading desk sets two level warnings to indicate when specified percentages of the daily buy and sell limit are reached for the firm. Once the firm reaches the maximum limit, the system will cancel all remaining buy and sell orders in the system for the trading desk and not permit it to enter anymore.

If the trading desk is satisfied with the information at 2112-2140, he/she can submit this information to the system by activation of Submit button 2106. However if the trading desk wishes to reset the display information for any reason, he/she would activate Reset button 2108.

The trading desk can also establish specific rules for use using its members that will control their ability to enter new orders on the system. Further, the trading desk can establish rules for permitting changes to be made to existing orders by its members. There are a number of ways that this can be done which are within the scope of the present invention.

Referring to FIG. 22 generally at 2200, a display is shown for individual traders to enter their preferences. Display 2202 includes display identifier line 2204, "New Order Default Settings" section 2206, "New Order Default Calculation Settings" section 2208, "Configuration Data" section 2210, and "Play A Sound When . . . " section 2212.

Referring to FIG. 22 at 2206, when a new order is entered, the trader can select certain default settings for that new order. If the order is submitted via the system client browser, the default settings at 2218 will be used, and if the order is submitted via the OMS (or EMS), the default settings at 2220 will be used.

Again referring to 2206, the description of sponsor information at 2222, type information at 2224, Invite Status information at 2226, time in force information at 2228, price protection information at 2234, negotiation instruction information at 2236, priority information at 2238 have been discussed previously with respect to the New Order form display at 800 and such descriptions are incorporated here by reference. At 2232, the trader is asked to provide whether or not the sponsor mode is "Preferred." It is intended that when a trader is acting through a sponsor so this field will be marked as "Preferred." The other selection for this entry is "Direct" that has been described previously.

At 2240, the trader is asked to add capacity information. The capacity information is whether the participant in the trade is an Agency, Principal, or Exempt Principal.

Referring to FIG. 22 at 2208, the new order default calculation settings will be discussed. It is shown, that the trader will enter the information in this display for entering an order either using the system client browser or the OMS (or EMS). At 2242, the trader will enter the minimum volume percentage, and at 2244 the negotiation volume sensitivity percentage. The minimum volume percentage will be used by the system to calculate a minimum volume based on the maximum amount being traded to determine whether or not a trade will be effected. If the buyer falls below this amount, there will not be a trade. The negotiation volume sensitivity percentage at 2244 is used by the system to calculate the minimum number of shares to subtract from the minimum volume to create the lower limit volume buffer.

Referring to FIG. 22 at 2210, configuration data that is provided by the trader will be discussed. At 2246, the trader indicates whether he/she desires to automatically add a symbol to the symbol watch list when a new order is received. At 2248, the trader indicates whether he/she desires to desires to automatically remove a symbol from the symbol watch list when there have been no orders for that symbol under predetermined criteria, for example, such as time or there is no market is open for the symbol. This will apply only if the symbol was automatically added to the symbol watch list.

Referring to FIG. 22 at 2250, the trader adds the percentage value of the maximum number of orders allowed daily for a particular symbol at which trader will be notified of same via a notification warning.

Referring to FIG. 22 at 2212, the trader provides information with regard to events when he/she desires to receive audible warnings from the system. At 2252, the trader will receive a warning when a new negotiation has been recorded; at 2254 when an existing negotiation's terms has been changed by the counterparty; at 2256, when a negotiation opportunity has been received; and at 2258 when a trade has occurred.

If the trader is satisfied with the information at 2222-2258, he/she can submit this information to the system by activation of Submit button 2214. However, if the trader wishes to reset the display information from any system, he/she would activate Reset button 2216.

The information with respect to a trader may also be used by the system to provide necessary information for new orders that come into the system via another path other than through the system client or OMS (or EMS) system.

Referring to FIG. 23, generally at 2300, the trader's submission of price sensitivity information will be discussed. Display 2302, includes display identifier line 2304, action line 2306, sensitivity information segment 2308, and price sensitivity summary segment 2314. Referring to action line 2306, the trader will provide information whether he/she is providing a new price sensitivity default, updating a default, or deleting a default.

Referring to sensitivity information segment 2308, at 2320, the trader will provide the upper limit of a range to which the price sensitivity percentage input at 2322 and at 2324 will be applied. The system will use the numbers input at 2322 and 2324 to generate percentages to use in calculating price sensitivity for new orders if the value is not specifically set.

If the trader is satisfied with the information at 2320-2324, he/she can submit this information to the system by activation of Submit button 2310. However, if the trader wishes to reset the display information for any reason, he/she would activate Reset button 2312.

At 2314, the trader may provide a set of ranges for price sensitivity along with the numbers that will be used for calculating the price sensitivity percentages. Again, the information is provided for both the system client browser and OMS (or EMS) derived orders.

If the trader is satisfied with the information at 2314, he/she can submit this information to the system by activation of Submit List button 2316. However, if the trader wishes to reset the display information for any reason, he/she would activate Reset button 2318.

Again referring to FIG. 9, if the trader activates the Message icon at 910, it opens a Message window (not shown). This window may include the following message types: order acknowledgement messages, trade fill messages, negotiation acknowledgement messages, and alert notification messages. These messages typically will be listed in the window in descending time order. Each message may contain a time stamp and message catalog number, and may be accompanied by an audio queue if the trader made it one of his preferences according to section 2212 in FIG. 22. Although, the message information has been described above, other methods of listing messages and identifying them may be used and still be within the scope of the present invention.

Again referring to FIG. 7, display 706 has Actions icon 712. When this icon is activated, it will provide a drop-down menu that will permit a trader to change or cancel an order previously submitted to the system.

The terms and expressions that are use herein are meant for description not limitation. It being recognized that there may be minor changes or modifications that must take place and be within the scope of the present invention.

The invention claimed is:

1. An electronic trading system for anonymously trading at least large block trades of securities, comprising:

a plurality of system user interfaces for system users to communicate with an electronic trading platform for anonymously trading at least large block trades of securities in buy and sell transactions;

a communications network for bi-directional communications between the plurality of system user interfaces and the electronic trading platform; and the electronic trading platform in bi-directional communications with the plurality of system user interfaces through the communications network, with the electronic trading platform at least comprising, first means for receiving and comparing firm orders to buy or sell specified securities from system users and auto-matching such firm orders to buy or sell specified securities between counterparty system users to automatically complete a transaction;

second means for determining if trade pricing for auto-matching firm orders to buy or sell specified securities between counterparty system users is according to pricing rules, with such pricing rules specifying that trade pricing will have a predetermined relationship to a national best bid or offer (NBBO) price spread that includes auto-matching firm orders if the buy and sell prices for the security are within the NBBO, the buy and sell prices for the security are outside the upper limit of the NBBO, or the buy and sell prices for the security are outside the lower limit of the NBBO;

third means for determining if the NBBO price spread is a valid NBBO price spread; and fourth means for commencing and controlling a negotiation between counterparty system users that have firm orders to buy and sell specified securities on the electronic trading platform that have been considered for auto-matching at the first means but could not be auto-matched because trade pricing was outside the pricing rules or the NBBO price spread was invalid.

2. The system as recited in claim 1, wherein each of the plurality of system user interfaces includes a personal computer, desktop computer, or workstation.

3. The system as recited in claim 1, wherein the communications network includes a wired or wireless network.

4. The system as recited in claim 3, wherein a wireless network includes the Internet.

5. The system as recited in claim 1, wherein a firm order includes an order volume that is committed to trade by the system user.

6. The system as recited in claim 1, wherein a specified security includes a security having a specific identifying symbol.

7. The system as recited in claim 1, wherein a negotiation can conclude as a trade or be canceled.

8. An electronic trading system for anonymously trading at least large block trades of securities, comprising:

a plurality of system user interfaces for system users to communicate with an electronic trading platform for anonymously trading at least large block trades of securities in buy and sell transactions;

a communications network for bi-directional communications between the plurality of system user interfaces and the electronic trading platform; and the electronic trading platform in bi-directional communications with the plurality of system user interfaces through the communications network, with the electronic trading platform at least comprising, first means for receiving firm orders to buy or sell specified securities from system users and auto-matching such firm orders to buy or sell specified securities between counterparty system users to automatically complete a transaction;

second means for determining if trade pricing for auto-matching firm orders to buy or sell specified securities between counterparty system users is according to pricing rules, with such pricing rules specifying that trade pricing will have a predetermined relationship to a national best bid or offer (NBBO) price spread that includes auto-matching firm orders if the buy and sell prices for the security are within the NBBO, the buy and sell prices for the security are outside the upper limit of the NBBO, or the buy and sell prices for the security are outside the lower limit of the NBBO;

third means for determining if the NBBO price spread is a valid NBBO price spread;

fourth means for commencing and controlling a negotiation between counterparty system users that have firm orders to buy and sell specified securities on the electronic trading platform that have been considered for auto-matching at the first means but could not be auto-matched because the trade pricing was outside the pricing rules or the NBBO price spread was invalid; and fifth means for determining whether a system user should commence a negotiation with a potential counterparty according to the fourth means based on such counterparty's previous trading actions using the electronic trading platform.

9. The system as recited in claim 8, wherein each of the plurality of system user interfaces includes a personal computer, desktop computer, or workstation.

10. The system as recited in claim 8, wherein the communications network includes a wired or wireless network.

11. The system as recited in claim 10, wherein a wireless network includes the Internet.

12. The system as recited in claim 8, wherein a firm order includes an order volume that is committed to trade by the system user.

13. The system as recited in claim 8, wherein a specified security includes a security having a specific identifying symbol.

14. The system as recited in claim 8, wherein a negotiation can conclude as a trade or canceled by a counterparty.

15. The system as recited in claim 8, wherein the fifth means generates a scorecard value based on a counterparty's previous trading actions on the electronic trading platform.

16. A method for anonymously conducting at least large block trades of securities on an electronic trading platform, comprising the steps of:

(A) the electronic trading platform receiving from system users firm orders to buy and sell specified securities and storing the received firm orders in storage means;

(B) the electronic trading platform comparing each system user's firm order to buy or sell a specific security stored in the storage means with firm orders to buy or sell the specific security of counterparty system users that are stored in the storage means;

(C) the electronic trading platform testing a national best bid or offer (NBBO) price spread to determine if it is valid, and if it is valid, then step (D), and if it is invalid, then step (E);

(D) the electronic trading platform auto-matching and automatically completing a transaction between counterparty system user firm orders to buy or sell the specific security if trade pricing is according to pricing rules, with such pricing rules specifying that trade pricing will have a predetermined relationship to NBBO price spread that includes auto-matching firm orders if the buy and sell prices for the security are within the NBBO, the buy and sell prices for the security are outside the upper limit of the NBBO, or the buy and sell prices for the security are outside the lower limit of the NBBO and there is at least an overlapping volume of shares of such specific security, and if trade pricing is outside the pricing rules, then step (E);

(E) at least one of the counterparty system users identified at step (B) using the electronic trading platform for testing whether the other counterparty system user passes a scorecard level test, with the scorecard level test being based on such other counterparty system user's past activities regarding trades on the electronic trading platform, and if the scorecard level test is passed, then step (F), and if the scorecard level test is failed, then negotiations at step (F) will not be commenced; and (F) using the electronic trading platform to commence and control a negotiation between counterparty system users to buy or sell such specific security based on firm orders and completing a transaction in a trade to end negotiation by a counterparty accepting an offer of the other counterparty or matching an offer of the other counterparty, or not completing the transaction in a trade to end the negotiation by a counterparty canceling the negotiation.

17. The method as recited in claim 16, wherein system users communicate with the electronic trading platform through a wired or wireless network.

18. The method as recited in claim 17, wherein the wireless network includes the Internet.

19. The method as recited in claim 16, wherein system users communicate with the electronic trading platform through the communications network using an interface device.

20. The method as recited in claim 19, wherein the interface device includes a personal computer, desktop computer, or workstation.

21. The method as recited in claim 16, wherein a firm order includes an order volume that is committed to trade by the system user.

22. The method as recited in claim 16, wherein testing the validity of the NBBO price spread includes determining a historical NBBO price spread over a predetermined period of time and if a current NBBO price spread that is being used for auto-matching at step (D) is outside the historical NBBO price spread, then such current NBBO price spread is invalid.

23. The method as recited in claim 16, wherein testing the validity of the NBBO price spread includes determining if a NBBO price spread is greater than a predetermined ratio with respect to the specific security's share price.

24. The method recited in claim 16, wherein the pricing rules at least include that if a matching trade price for firm orders to buy and sell a specific security of the counterparty system users to a potential trade is within the NBBO price spread, then a trade price for auto-matching will be the matching trade price.

25. The method as recited in claim 16, wherein the pricing rules at least include that if a matching trade price for firm orders to buy and sell a specific security of the counterparty system users to the potential trade is greater than an upper limit of the NBBO price spread, then the trade price for auto-matching will be the matching trade price, if the counterparty system user to a potential trade buying the specific security has previously agreed to trade outside the NBBO price spread.

26. The method as recited in claim 16, wherein the pricing rules at least include that if a matching trade price for firm orders to buy and sell a specific security of the counterparty system users to the potential trade is less than a lower limit of the NBBO price spread, then the trade price for auto-matching will be the matching trade price, if the counterparty system user to a potential trade selling the specific security has previously agreed to trade outside the NBBO price spread.

27. The method as recited in claim 16, wherein crossed trade prices under the pricing rules include a firm order trade price of a counterparty system user to a potential trade buying a specific security being higher than a firm order trade price of another counterparty system user to the potential trade selling the specific security.

28. The method recited in claim 27, wherein the pricing rules at least include that if trade prices for firm orders to buy and sell a specific security of the counterparty system users to a potential trade cross and are within the NBBO price spread, then a trade price for auto-matching will be the counterparty trade price that is closest to a NBBO price spread mid-point.

29. The method recited in claim 27, wherein the pricing rules at least include that if trade prices for firm orders to buy and sell a specific security of the counterparty system users to a potential trade cross and such trade prices are equally distributed from a NBBO price spread mid-point, then the trade price will be a NBBO price spread mid-point.

30. The method as recited in claim 27, wherein the pricing rules at least include that if trade prices for firm orders to buy and sell a specific security of the counterparty system users to a potential trade cross and at least the trade price of the counterparty system user buying the specific security is greater than an upper limit of the NBBO price spread, then the trade price for auto-matching will be the trade price closest to a NBBO price spread mid-point, if the counterparty system user to the potential trade buying the specific security has previously agreed to trade outside the NBBO price spread.

31. The method as recited in claim 27, wherein the pricing rules at least include that if trade prices for firm orders to buy and sell a specific security of the counterparty system users to a potential trade cross and at least the trade price of the counterparty system user selling the specific security is less than a lower limit of the NBBO price spread, then the trade price for auto-matching will be the trade price closest to a NBBO price spread mid-point, if the counterparty system user to the potential trade selling the specific security has previously agreed to trade outside the NBBO price spread.

32. The method as recited in claim 16, wherein scorecard level testing includes testing to determine such other counterparty system user's history with regard to conducting at least predetermined types of trades on the electronic trading platform.

33. The method as recited in claim 32, wherein the scorecard level testing history for consideration includes a history over a predetermined period of time.

34. The method as recited in claim 16, wherein scorecard level testing includes testing to determine such other counterparty system user's history with regard to conducting a plurality of types of trades on the electronic trading platform.

35. The method as recited in claim 34, wherein the scorecard level testing history for consideration for each type of trade on the electronic trading platform includes a history over a different predetermined period.

36. The method as recited in claim 34, wherein the scorecard level testing history for consideration for each type of trade on the electronic trading platform includes a history over a same predetermined period of time.

37. The method as recited in claim 16, wherein the pricing rules at least include that if auto-matching has a NBBO mid-point or better as a limit, then auto-matching can occur only if the other counterparty's trade pricing is set with the NBBO mid-point as the trade price limit as appropriate for such other counterparty being a buyer or seller.

* * * * *